(12) United States Patent
Park et al.

(10) Patent No.: US 10,349,455 B2
(45) Date of Patent: Jul. 9, 2019

(54) METHOD FOR DATA COMMUNICATION BETWEEN NAN DEVICES, AND NAN DEVICE FOR PERFORMING DATA COMMUNICATION

(71) Applicant: LG ELECTRONICS INC., Seoul (KR)

(72) Inventors: Giwon Park, Seoul (KR); Dongcheol Kim, Seoul (KR); Byungjoo Lee, Seoul (KR); Hyunhee Park, Seoul (KR)

(73) Assignee: LG Electronics Inc., Seoul (KR)

( * ) Notice: Subject to any disclaimer, the term of this patent is extended or adjusted under 35 U.S.C. 154(b) by 16 days.

(21) Appl. No.: 15/553,516

(22) PCT Filed: Dec. 9, 2015

(86) PCT No.: PCT/KR2015/013467
§ 371 (c)(1),
(2) Date: Aug. 24, 2017

(87) PCT Pub. No.: WO2016/137097
PCT Pub. Date: Sep. 1, 2016

(65) Prior Publication Data
US 2018/0042059 A1    Feb. 8, 2018

Related U.S. Application Data

(60) Provisional application No. 62/128,521, filed on Mar. 5, 2015, provisional application No. 62/121,485, filed (Continued)

(51) Int. Cl.
*H04W 72/12* (2009.01)
*H04W 76/14* (2018.01)
(Continued)

(52) U.S. Cl.
CPC ............ *H04W 76/14* (2018.02); *H04W 8/005* (2013.01); *H04W 12/06* (2013.01); *H04W 28/02* (2013.01);
(Continued)

(58) Field of Classification Search
CPC . H04W 12/06; H04W 28/02; H04W 28/0278; H04W 48/10; H04W 72/1263; H04W 72/1278; H04W 8/005
See application file for complete search history.

(56) References Cited

U.S. PATENT DOCUMENTS

2011/0149806 A1    6/2011  Verma et al.
2015/0341961 A1*  11/2015  Kim .................. H04W 74/0808
                                                                                       370/338
(Continued)

FOREIGN PATENT DOCUMENTS

WO    2013122424 A1    8/2013
WO    2014092450 A1    6/2014
(Continued)

*Primary Examiner* — Mewale A Ambaye
(74) *Attorney, Agent, or Firm* — Dentons US LLP

(57) ABSTRACT

Disclosed are a method for data communication between NAN devices, and a NAN device for performing data communication. The method for data communication between the NAN devices comprises the steps of: receiving a service discovery frame from a second NAN device by a first NAN device; transmitting a TIM element to a second NAN device by the first NAN device having received the service discovery frame and being triggered by a user action, wherein the TIM element includes information related to data buffered with respect to the second NAN device; performing, by the first NAN device, an authentication procedure and an association procedure with the second NAN device on the basis of a request of the second NAN device having received the TIM element; transmitting a falling frame from the second NAN device by the first NAN (Continued)

device; and transmitting, by the first NAN device, the data buffered with respect to the second NAN device, to the second NAN device in response to the falling frame.

4 Claims, 20 Drawing Sheets

Related U.S. Application Data on Feb. 26, 2015, provisional application No. 62/120,892, filed on Feb. 26, 2015.

(51) Int. Cl.
| | |
|---|---|
| *H04W 12/06* | (2009.01) |
| *H04W 28/02* | (2009.01) |
| *H04W 48/10* | (2009.01) |
| *H04W 74/06* | (2009.01) |
| *H04W 8/00* | (2009.01) |
| *H04W 84/18* | (2009.01) |
| *H04W 84/12* | (2009.01) |

(52) U.S. Cl.
CPC ....... *H04W 28/0278* (2013.01); *H04W 48/10* (2013.01); *H04W 72/1263* (2013.01); *H04W 72/1278* (2013.01); *H04W 74/06* (2013.01); *H04W 84/12* (2013.01); *H04W 84/18* (2013.01)

(56) References Cited

U.S. PATENT DOCUMENTS

| | | | |
|---|---|---|---|
| 2016/0014715 A1* | 1/2016 | Patil | H04W 52/0216 370/329 |
| 2017/0280383 A1* | 9/2017 | Park | H04W 52/02 |
| 2018/0014316 A1* | 1/2018 | Guo | H04W 72/121 |

FOREIGN PATENT DOCUMENTS

| | | |
|---|---|---|
| WO | 2014107031 A1 | 7/2014 |
| WO | 2014109513 A1 | 7/2014 |

\* cited by examiner

FIG. 1
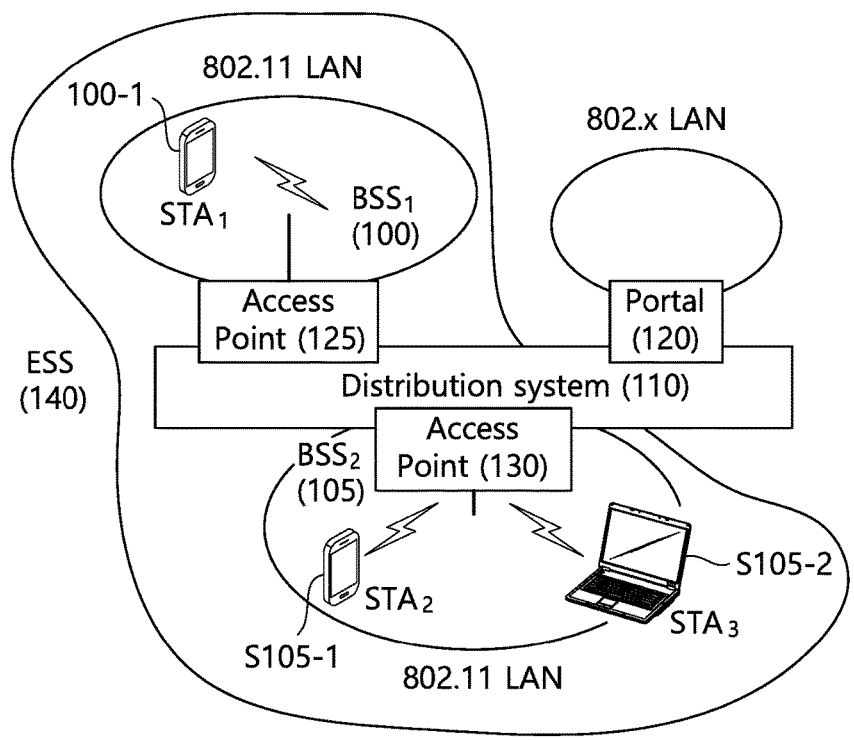
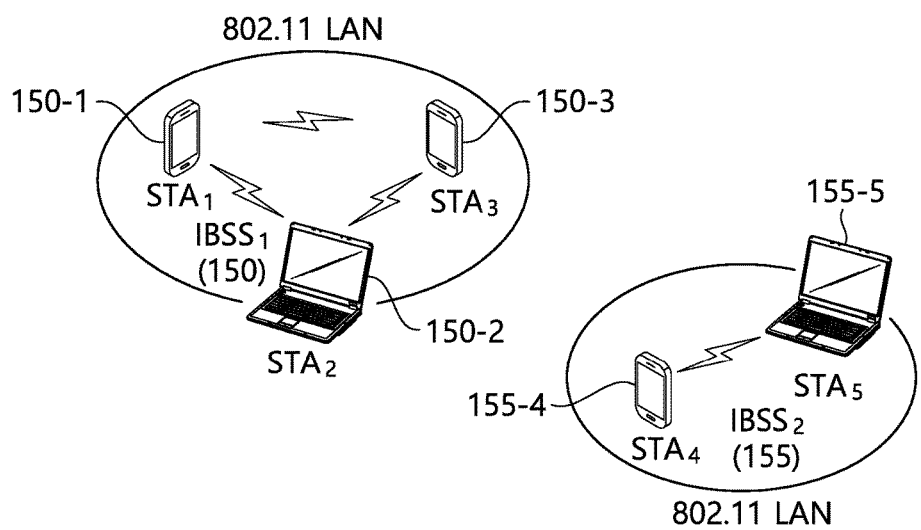

DW: Discovery Window
FAW : Further Availability Window
TW: TIM Window

FIG. 12
Service Discovery Frame
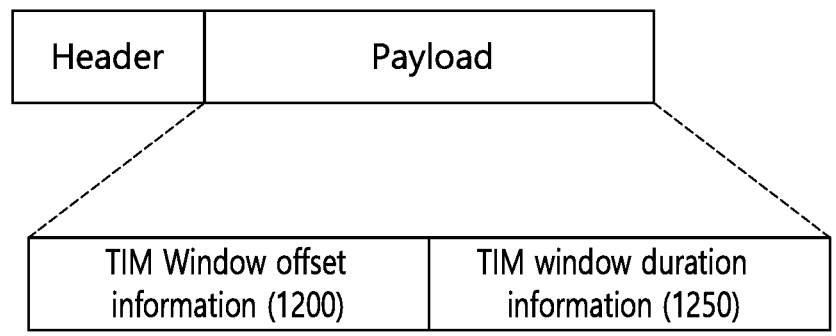
Association Response Frame
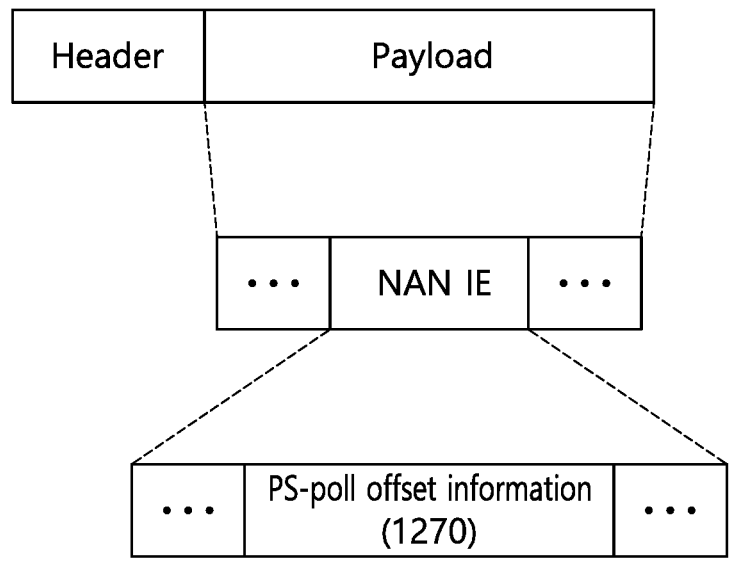

DW: Discovery Window
FAW : Further Availability Window
TW: TIM Window

FIG. 14
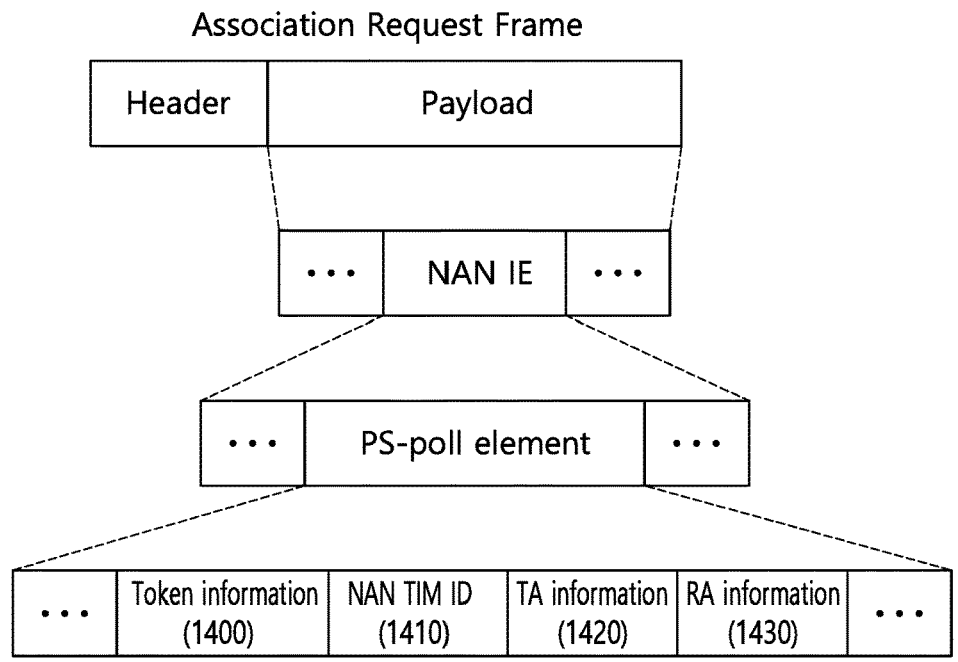
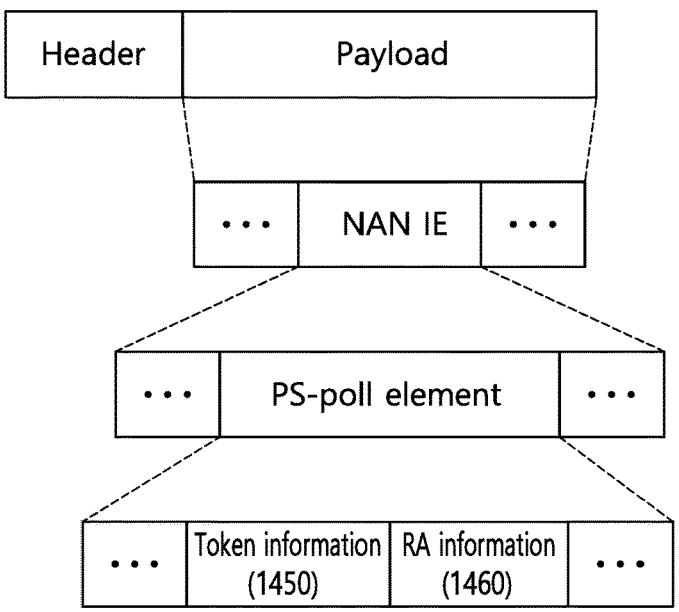

DW: Discovery Window
FAW : Further Availability Window
TW: TIM Window

FIG. 16
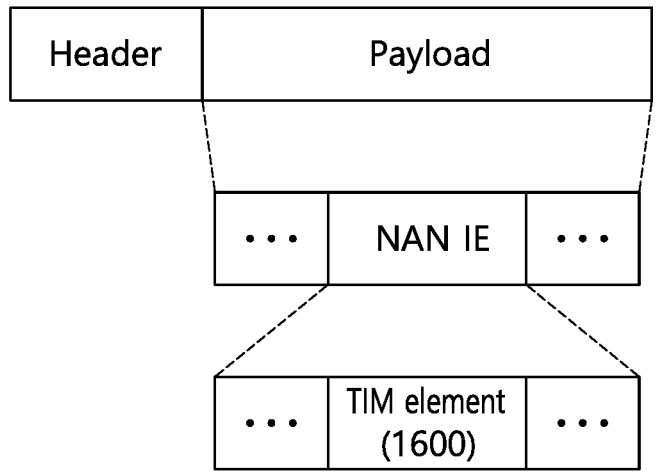
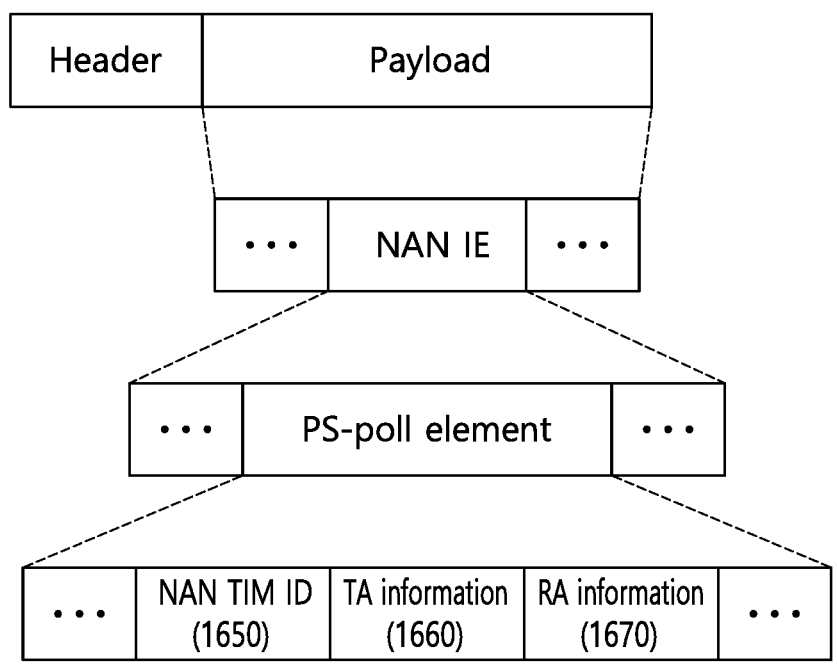

DW: Discovery Window
FAW : Further Availability Window
TW: TIM Window

METHOD FOR DATA COMMUNICATION BETWEEN NAN DEVICES, AND NAN DEVICE FOR PERFORMING DATA COMMUNICATION

CROSS-REFERENCE TO RELATED APPLICATIONS

This application is the National Phase of PCT International Application No. PCT/KR2015/013467, filed on Dec. 9, 2015, which claims priorities under 35 U.S.C. 119(e) to U.S. Provisional Application No. 62/128,521, filed on Mar. 5, 2015, 62/121,485, filed on Feb. 26, 2015, and 62/120,892, filed on Feb. 26, 2015, which are hereby incorporated by reference herein in their entirety.

BACKGROUND OF THE INVENTION

Field of the Invention

The present invention relates to wireless communication and, most particularly, to a method for data communication between neighbor awareness networking (NAN) devices, and a NAN device for performing data communication.

Related Art

There is a growing demand for a proximity-based service for transmitting and receiving data between users in close proximity and application technologies based on the proximity-based service. Recently, with the explosive use of mobile Internet devices such as a smart phone, a tablet, or the like, there is a need for a device-to-device (D2D) communication technology which provides a new proximity-based service capable of guaranteeing a wider transmission range and a higher quality of service (QoS) than the conventional D2D communication technology such as Bluetooth or wireless fidelity (WiFi) peer to peer (P2P). The D2D communication technology may be utilized in various services such as commercial services, public safety related services, or the like.

WiFi Alliance (WFA) has been conducting research to support low power discovery between a plurality of terminals (or stations (STAs)) since 2011, and completed the draft specification 1.0 in May 2013. Unlike IEEE 802.11aq, the WFA supports mutual discovery between terminals without an access point (AP) in an independent basic service set (IBSS) environment of IEEE 802.11, and uses a synchronous-type protocol. Interworking with a WiFi P2P specification is taken into consideration in direct communication performed between terminals after the discovery between the terminals.

SUMMARY OF THE INVENTION

Technical Objects

An object of the present invention is to provide a method for data communication between NAN devices.

Another object of the present invention is to provide a NAN device for performing data communication.

Technical Solutions

In order to achieve the above-described technical object of the present invention, according to an aspect of the present invention, a data communication method between neighbor awareness networking (NAN) devices includes the steps of receiving, by a first NAN device, a service discovery frame from a second NAN device, transmitting, by the first NAN device having received the service discovery frame, a traffic indication map (TIM) element to the second NAN device by being triggered by a user's action, wherein the TIM element includes information related to data being buffered for the second NAN device, performing, by the first NAN device, an authentication procedure and an association procedure with the second NAN device based on a request from the second NAN device having received the TIM element, receiving, by the first NAN device, a polling frame from the second NAN device, and transmitting, by the first NAN device, data being buffered for the second NAN device to the second NAN device as a response to the polling frame.

In order to achieve the above-described technical object of the present invention, according to another aspect of the present invention, a neighbor awareness networking (NAN) device performing a data communication method including a radio frequency (RF) unit transmitting and/or receiving radio signals, and a processor being operatively connected to the RF unit, wherein the processor may be configured to receive a service discovery frame from another NAN device, to transmit, after receiving the service discovery frame, a traffic indication map (TIM) element to the other NAN device by being triggered by a user's action, wherein the TIM element includes information related to data being buffered for the other NAN device, to perform an authentication procedure and an association procedure with the other NAN device based on a request from the other NAN device having received the TIM element, to receive a polling frame from the other NAN device, and to transmit data being buffered for the other NAN device to the other NAN device as a response to the polling frame.

Effects of the Invention

In performing data communication between NAN devices, authentication and association procedures for data communication are newly defined. The data communication between the NAN devices using the newly defined authentication and association procedures may be performed more quickly as a more simplified procedure.

BRIEF DESCRIPTION OF THE DRAWINGS

FIG. 1 is a conceptual view illustrating the structure of a wireless local area network (WLAN).

FIG. 12 is a conceptual view illustrating a service discovery frame and an association response frame according to an exemplary embodiment of the present invention.

FIG. 14 is a conceptual view illustrating an association request frame/association response frame according to an exemplary embodiment of the present invention.

FIG. 16 is a conceptual view illustrating an association request frame/association response frame according to an exemplary embodiment of the present invention.

DESCRIPTION OF EXEMPLARY EMBODIMENTS

FIG. 1 is a conceptual view illustrating the structure of a wireless local area network (WLAN).

An upper part of FIG. 1 shows the structure of the institute of electrical and electronic engineers (IEEE) 802.11 infrastructure network.

Referring to the upper part of FIG. 1, the WLAN system may include one or more basic service sets (BSSs) 100 and 105. The BSS 100 or 105 is a set of an access point (AP) such as AP 125 and a station (STA) such as STA1 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same service set identification (SSID).

The portal 120 may function as a bridge that performs connection of the WLAN network (IEEE 802.11) with another network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent basic service set (BSS).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the Institute of Electrical and Electronics Engineers (IEEE) 802.11 standards and that includes a physical layer interface for radio media, and the term "STA" may, in its definition, include both an AP and a non-AP station (STA).

The STA may be referred to by various terms such as mobile terminal, wireless device, wireless transmit/receive unit (WTRU), user equipment (UE), mobile station (MS), mobile subscriber unit, or simply referred to as a user.

Figure 2:
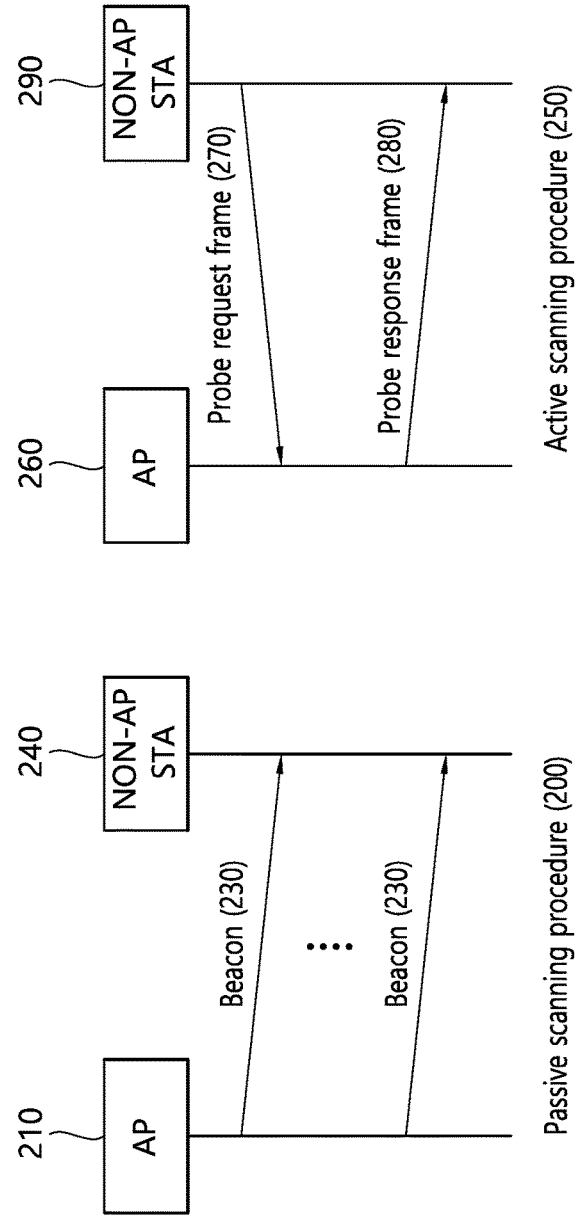
FIG. 2 is a conceptual view illustrating a scanning method in a wireless LAN.

FIG. 2 is a conceptual view illustrating a scanning method in a wireless LAN.

Referring to FIG. 2, the scanning method may be divided into passive scanning 200 and active scanning 250.

Referring to the left side of FIG. 2, passive scanning 200 may be performed by a beacon frame 230, which is periodically broadcasted by an AP 210. The AP 210 of the wireless LAN broadcasts a beacon frame 230 to a non-AP STA 240 at each specific interval (e.g., 100 msec). Information on the current network may be included in the beacon frame 230. By receiving the beacon frame 230 that is periodically broadcasted, the non-AP STA 240 receives the network information and may perform scanning on the AP 240, which will be performing the authentication/association procedure, and the channel.

The passive scanning method 200 may be performed by simply receiving the beacon frame 230 that is being transmitted from the AP 210 without requiring the non-AP STA 240 to transmit any frames. Therefore, the passive scanning 200 is advantageous in that the overall overhead, which occurs due to the transmission/reception of data within the network, is small. However, since the scanning process can only be performed manually in proportion to the cycle of the beacon frame 230, passive scanning 200 is disadvantageous in that the time consumed for performing the scanning process is relatively longer in comparison with the active scanning method. Detailed description on the beacon frame is disclosed in 8.3.3.2 beacon frame of the IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter referred to as IEEE 802.11)', which was disclosed in November 2011. In IEEE 802.11 ai, a beacon frame of another format may be additionally used, and such beacon frame may be referred to as a fast initial link setup (FILS) beacon frame. Additionally, a measurement pilot frame may be used in the scanning procedure as a frame including only a portion of the information of the beacon frame. The measurement pilot frame is disclosed in the IEEE 802.11 8.5.8.3 measurement pilot format.

Referring to the right side of FIG. 2, in active scanning 250, a non-AP STA 290 may transmit a probe request frame 270 to an AP 260, thereby being capable of actively performing a scanning procedure.

After receiving the probe request frame 270 from the non-AP STA 290, the AP 260 waits for a random period of time in order to prevent frame collision. And, then, the AP 260 may include network information to a probe response frame 280 and may transmit the probe response frame 280 to the non-AP STA 290. The non-AP STA 290 may obtain the network information based on the received probe response frame 280 and may then stop the scanning procedure.

In case of active scanning 250, since the non-AP STA 290 actively performs scanning, it is advantageous in that the time consumed for performing the scanning procedure is short. However, since the non-AP STA 290 is required to transmit the probe request frame 270, it is disadvantageous in that the network overhead increases for the transmission and reception of the frames. The probe request frame 270 is disclosed in IEEE 802.11 8.3.3.9, and the probe response frame 280 is disclosed in IEEE 802.11 8.3.3.10.

Once the scanning is completed, the AP and the non-AP STA may perform the authentication and association procedures.

Figure 3:
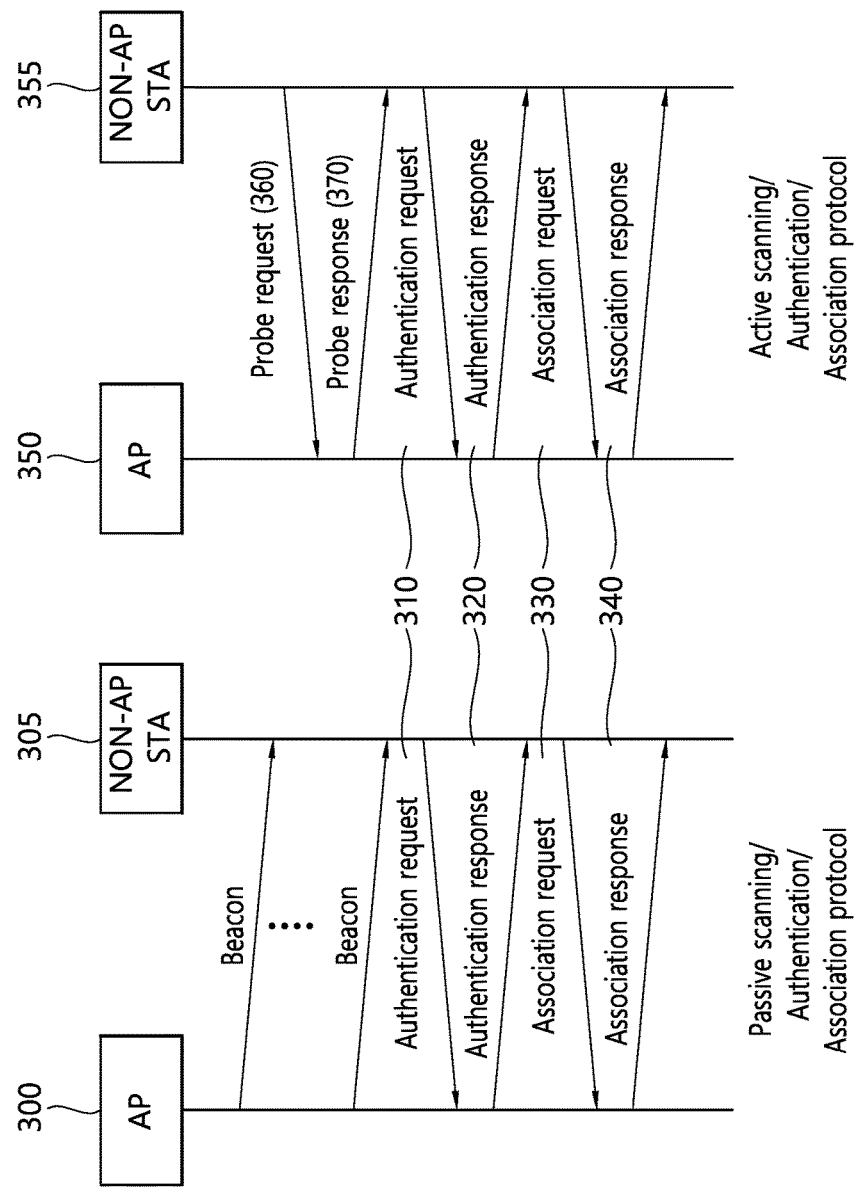
FIG. 3 is a conceptual view illustrating an authentication procedure and an association procedure being performed after the scanning procedure of the AP and the STA.

FIG. 3 is a conceptual view illustrating an authentication procedure and an association procedure being performed after the scanning procedure of the AP and the STA.

Referring to FIG. 3, after performing the passive/active scanning procedure, the authentication procedure and the association procedure may be performed with one of the scanned APs.

The authentication and association procedures may be performed, for example, through 2-way handshaking. The left side of FIG. 3 is a conceptual view showing the authentication and association procedures after performing passive scanning, and the right side of FIG. 3 is a conceptual view showing the authentication and association procedures after performing scanning.

Regardless of whether the active scanning method or the passive scanning method has been used, the authentication procedure and the association procedure may be equally performed by exchanging an authentication request frame 310/authentication response frame 320 and an association request frame 330/association response frame 340 between the AP 300 and 350 and the non-AP STA 305 and 355.

During the authentication procedure, the non-AP STA 305 and 355 may transmit an authentication request frame 310 to the AP 300 and 350. As a response to the authentication request frame 310, the AP 300 and 350 may transmit an authentication response frame 320 to the non-AP STA 305 and 355. Detailed description on the authentication frame format is disclosed in IEEE 802.11 8.3.3.11.

During the association procedure, the non-AP STA 305 and 355 may transmit an association request frame 330 to the AP 300 and 350. And, as a response to the association request frame 330, the AP 300 and 350 may transmit an association response frame 340 to the non-AP STA 305 and 355. Information related to the ability of the non-AP STA 305 and 355 is included in the association request frame 330, which is transmitted to the AP. Based on the capability information of the non-AP STA 305 and 355, the AP 300 and 350 may determine whether or not the non-AP STA 305 and 355 can be supported. In case the non-AP STA 305 and 355 can be supported, the AP 300 and 350 may transmit the association response frame 340 to the non-AP STA 305 and 355. The association response frame 340 may include information on whether or not the association request frame 330 is accepted and the corresponding reason and capability information of the non-AP STA that can be supported by the corresponding AP. Detailed description on the association frame format is disclosed in IEEE 802.11 8.3.3.5/8.3.3.6.

Figure 4:
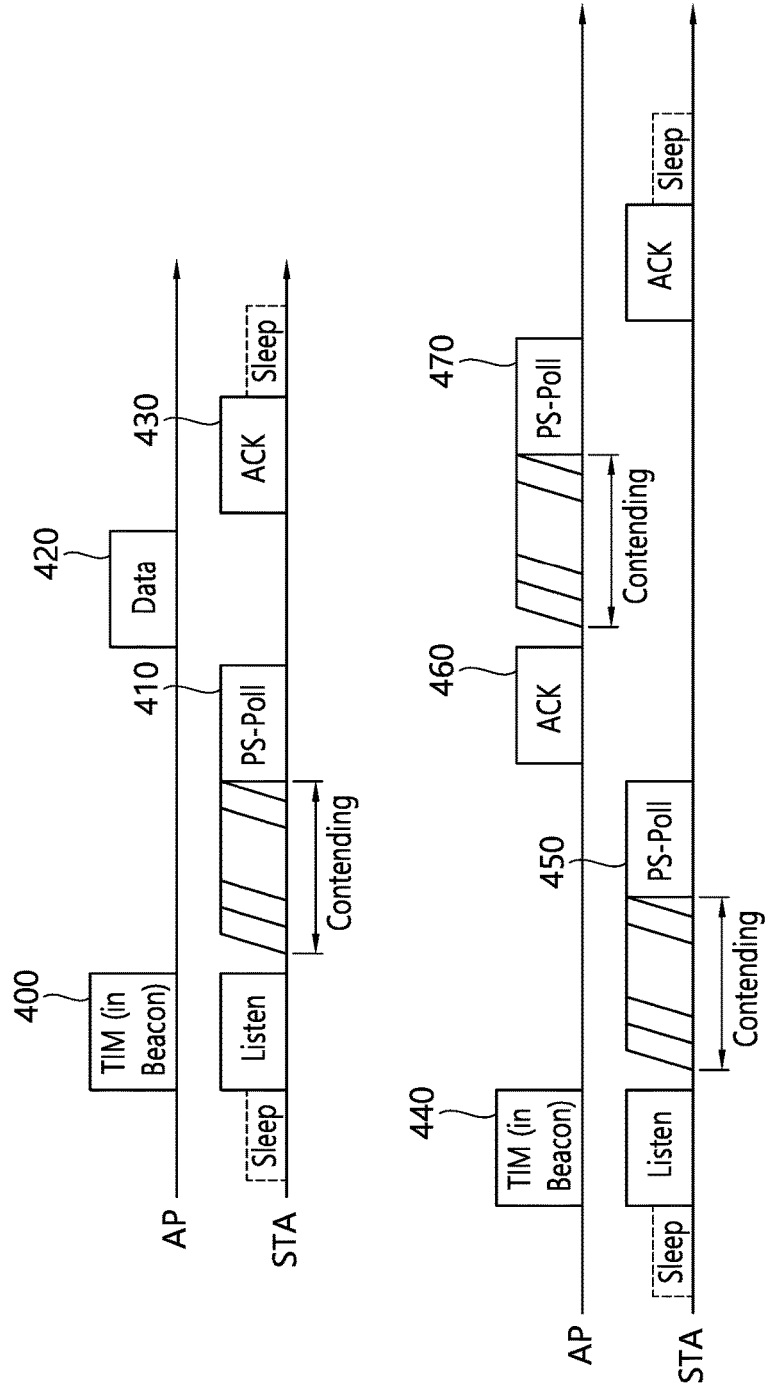
FIG. 4 is a conceptual view illustrating a power save method based on a beacon frame.

FIG. 4 is a conceptual view illustrating a power save method based on a beacon frame.

Referring to FIG. 4, the AP may periodically transmit a beacon frame, and, while considering the transmission timing of the beacon frame, the STA operating in the Power Save mode may periodically shift from the doze state to the awake state, thereby being capable of receiving the beacon frame. The beacon frame based Power Saving method may also be expressed by using the term TIM-based power save mode.

The beacon frame may include a traffic indication map (TIM) element. The TIM element may be used for transmitting the information on the pending downlink data for the STA to the AP. For example, the TIM element may include information on the pending downlink data for the STA based on a bitmap.

The TIM element may be identified as a TIM or DTIM (delivery TIM). The TIM may indicate the presence of pending downlink data that are to be transmitted to the STA based on unicast. The DTIM may indicate the presence of pending downlink data that are to be transmitted based on broadcast/multicast. The TIM/DTIM may include a traffic indication virtual bitmap. Each bit included in the traffic indication virtual bitmap may indicate the presence of buffered data for STA(s) having an association identifier (AID) in a corresponding bit therein.

The upper portion of FIG. 4 discloses a method of an AP for transmitting a downlink frame based on an immediate response to a power save (PS)-poll frame.

Referring to the upper portion of the FIG. 4, the STA may receive information on the presence of pending downlink data for the STA from the AP based on the TIM of the beacon frame 400. The STA may transmit a PS-poll frame 410 to the AP. The AP may receive the PS-poll frame 410 from the STA and may then transmit a downlink frame 420 to the STA as an immediate response to the received PS-poll frame 410. The immediate response to the PS-poll frame of the AP may be performed after a short interframe space (SIFS) after receiving the PS-poll frame.

The STA may transmit an ACK frame 430 as a response to the downlink frame. In case the transmission of the pending downlink data for the STA is ended, the STA operating in the Power Save mode may perform shifting (or transition) back to the doze state.

The lower portion of FIG. 4 discloses a method of an AP for transmitting a downlink frame based on a deferred response to a PS-poll frame.

Referring to the lower portion of the FIG. 4, the STA may receive information on the presence of pending downlink data for the STA from the AP based on the TIM of the beacon frame 440. The STA may transmit a PS-poll frame 450 to the AP. The AP may receive the PS-poll frame 450 from the STA and may then transmit an ACK frame 460 to the STA as a response to the received PS-poll frame 450. After the transmission of the ACK frame 460, the AP may transmit a downlink frame 470 including the pending downlink data to the STA. After receiving the ACK frame 460, the STA may monitor the downlink frame 470 being transmitted by the AP to the STA.

Similarly, in case the transmission of the pending downlink data for the STA is ended, the STA operating in the Power Save mode may perform shifting (or transition) from the awake state back to the doze state.

The WiFi Alliance (WFA) is currently carrying out research on neighbor awareness technology. The neighbor awareness technology allows an STA to operate in a background mode and to search for and discover diverse types of application by transmitting a small number of messages (or low capacity (or small-sized or short) messages).

In case the neighbor awareness technology is used, the STA may search for and discover neighboring services prior to being connected to a service providing device. The STA may search or a service by using neighbor awareness networking (NAN). And, then, by executing a corresponding application, the STA may connect to Wi-Fi Direct or a legacy wireless LAN network, thereby being capable of using the corresponding service.

NAN should be designed to operate smoothly in crowded and congested environments as well as indoor environments and to minimize power consumption. The STA may transmit and receive information on available services to and from other STAs via NAN and may then opt-in (or accept) connection with the discovered STA(s). The STA and the discovered STA(s) may be connected to one another via device-to-device direct connection.

Hereinafter, an STA or AP performing communication based on NAN may be expressed by using the term NAN device, and, most particularly, among the NAN device, a NAN device creating a NAN cluster may be expressed by using the term anchor master, and, among the NAN devices included in the NAN cluster, at least one NAN device may correspond to a NAN master.

Hereinafter, a Neighbor Awareness Networking (NAN) topology will be disclosed. A NAN network may be configured of NAN devices using a set (or group) of identical NAN parameters (e.g., a time section between contiguous discovery windows, a section of a discovery window, a beacon interval, or NAN channel, and so on). The NAN devices may configure a NAN cluster. The NAN cluster may use a set of identical NAN parameters, and the NAN cluster may also correspond to a set of NAN devices that operate by being synchronized to the same discovery window schedule.

Figure 5:
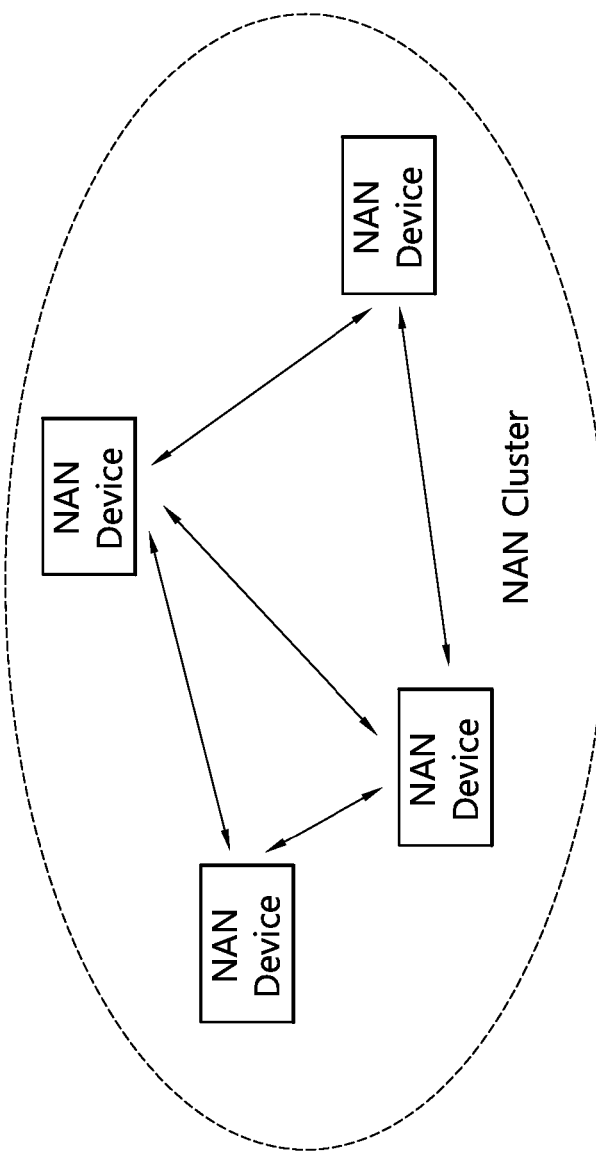
FIG. 5 and FIG. 6 are conceptual views illustrating NAN clusters.
Figure 6:
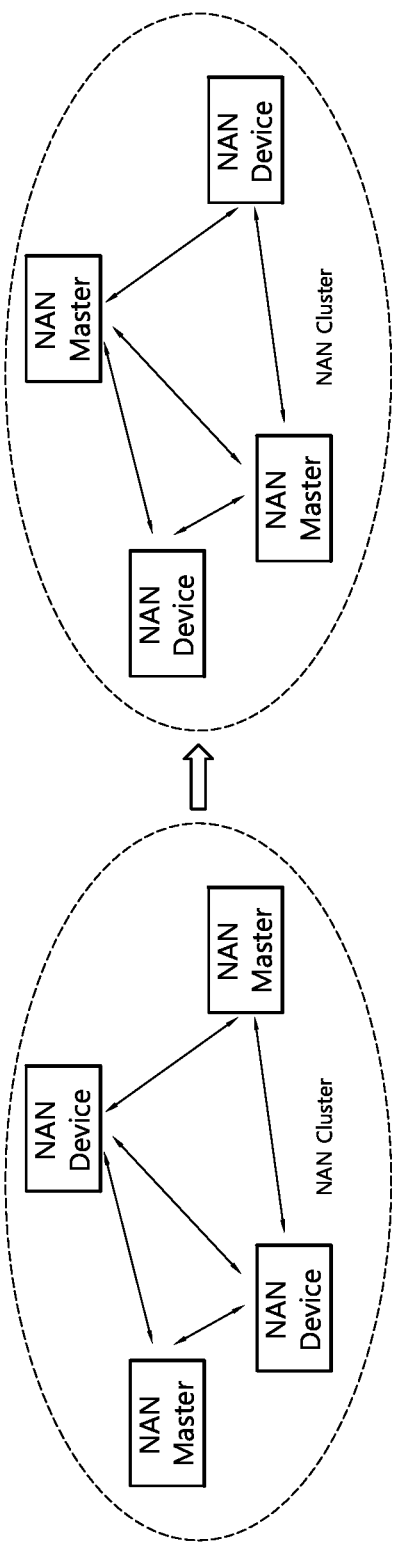

FIG. 5 and FIG. 6 are conceptual views illustrating NAN clusters.

Referring to FIG. 5, a NAN device belonging to a NAN cluster may directly transmit a NAN service discovery frame to another NAN device within the range of a discovery window based on multicast/unicast.

Referring to FIG. 6, as described above, one or more NAN masters may exist in a NAN cluster, and the NAN master(s) within the NAN cluster may be varied (or changed). Also, the NAN master may transmit all of a NAN Sync Beacon frame, a NAN discovery Beacon frame, and a NAN service discovery frame.

The NAN Sync Beacon frame may be used for the synchronization of the NAN devices within the NAN cluster. The NAN discovery Beacon frame may be used for the purpose of performing advertisement in order to allow the cluster to be discovered by NAN devices that are not subscribed to the corresponding NAN cluster. The NAN service discovery frame may be used for the purpose of exchanging information corresponding to the services between each of the NAN devices by having the NAN devices, which are included in the NAN cluster, advertise the services among one another.

Figure 7:
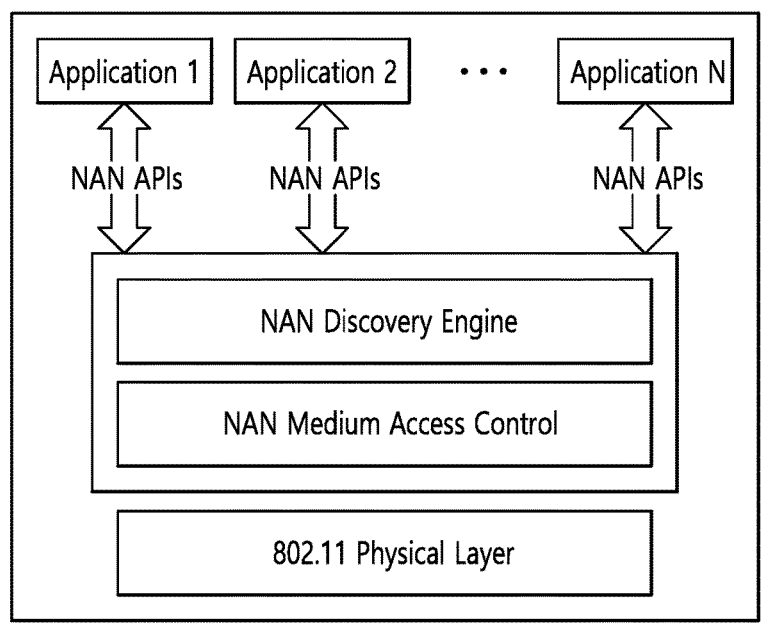
FIG. 7 is a conceptual view illustrating a structure of a NAN device.

FIG. 7 is a conceptual view illustrating a structure of a NAN device.

Referring to FIG. 7, the NAN device is based on a physical layer of 802.11, and the main components of the NAN device correspond to a NAN Discovery Engine, a NAN Medium Access Control (MAC), and NAN application programming interfaces (APIs) for each application (Application 1, Application 2, . . . , Application N).

Figure 8:
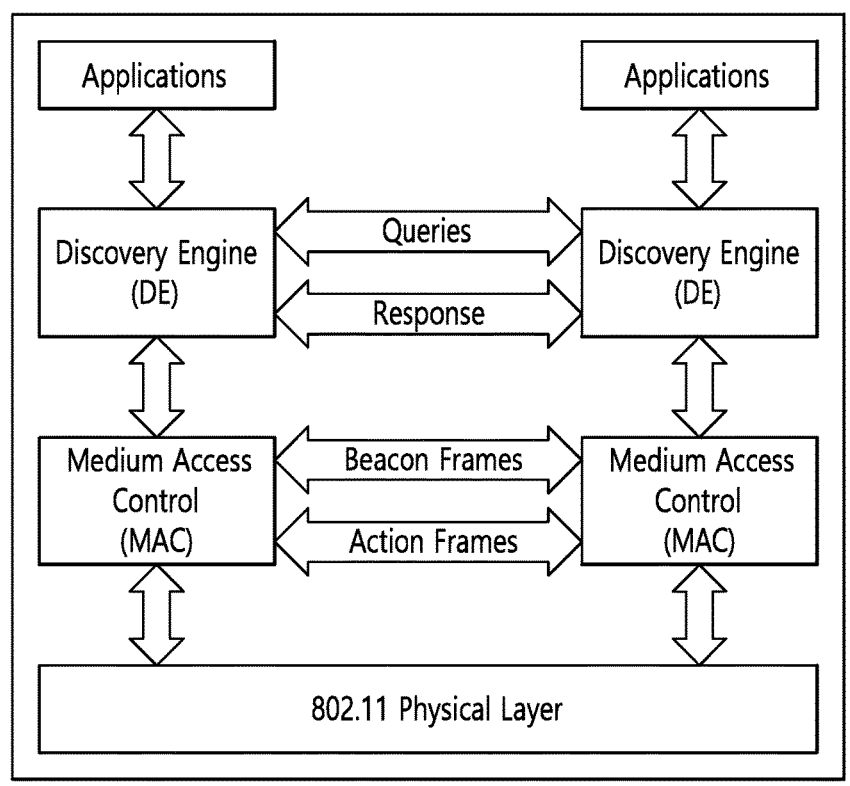
FIG. 8 and FIG. 9 are conceptual views illustrating relations between NAN components.
Figure 9:
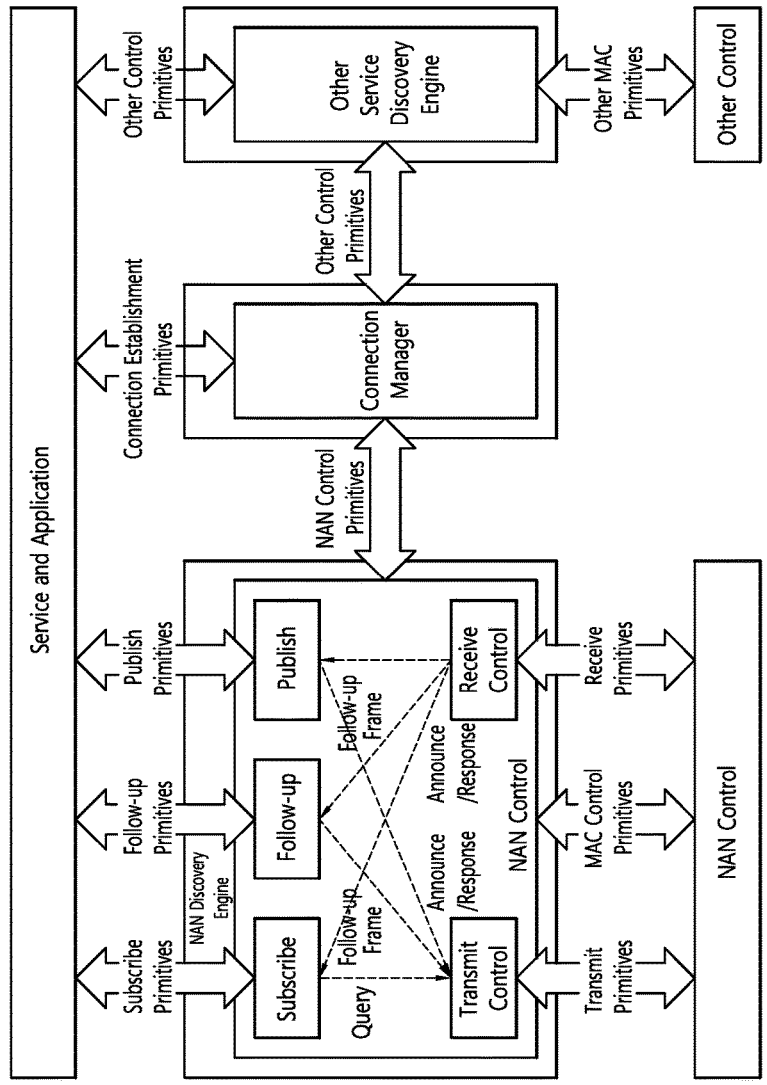

FIG. 8 and FIG. 9 are conceptual views illustrating relations between NAN components.

Referring to FIG. 8 and FIG. 9, service requests and service responses are processed by the NAN discovery engine, and the NAN beacon frames and NAN service discovery frames are processed by the NAN MAC. The NAN discovery engine may provide functions of subscribe, publish, and follow-up.

The publish/subscribe function is performed through a service interface provided by a service/application. When a publish/subscribe command is executed, instances of the publish/subscribe function are generated. Each instance is independently operated, and, depending upon the implementation, multiple instances may be operated simultaneously. The follow-up function corresponds to a means for the service/application that transmits and receives (or tranceives) service-specific information.

Figure 10:
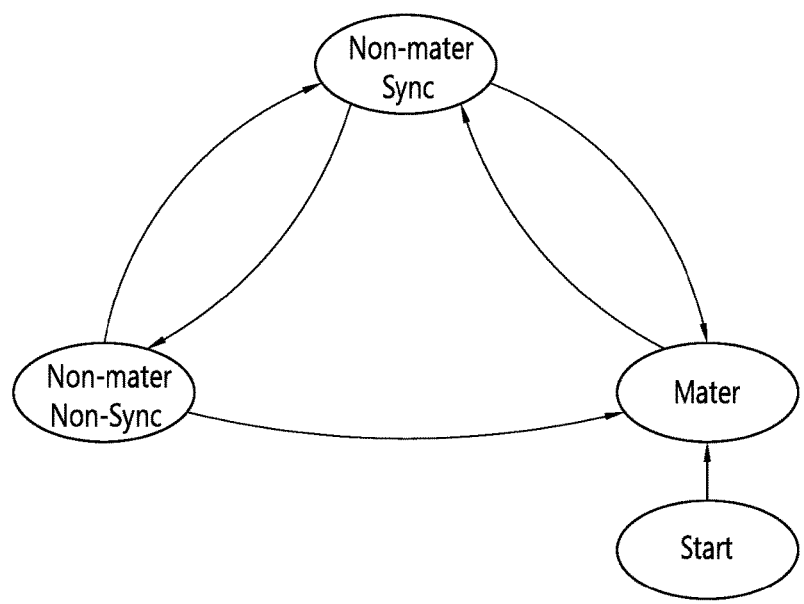
FIG. 10 is a conceptual view illustrating a function and status of a NAN device.

FIG. 10 is a conceptual view illustrating a function and status of a NAN device.

Referring to FIG. 10, the NAN device may operate as a NAN master that performs the role of a master (or master role). Also, the role of the NAN master of the NAN device may be changed to another role. More specifically, the NAN device may be shifted to multiple roles and states.

The roles and states that can be given (or assigned) to the NAN device may correspond to Master (hereinafter, Master refers to Master role and sync State), Non-Master Sync, Non-Master Non-Sync, and so on. Depending upon the role and state of the NAN device, the transmission and non-transmission of the NAN discovery beacon frame and/or NAN sync beacon frame may be determined.

Table 1 shown below indicates whether the NAN discovery beacon frame and/or NAN sync beacon frame is transmittable or non-transmittable in accordance with the role and state of the NAN device. C

TABLE 1

| Role and state | NAN discovery beacon frame | NAN synchronization beacon frame |
|---|---|---|
| Master | Transmittable | Transmittable |
| Non-Master Sync | Non-transmittable | Transmittable |
| Non-Master Non-Sync | Non-transmittable | Non-transmittable |

The state of the NAN device may be determined through a Master Rank. The Master Rank indicates an intention of the NAN device that intends to be operated as the NAN master (or to serve as the NAN master). More specifically, the Master Rank having the higher value indicates a higher preference level for the NAN master of the NAN device. The NAN master rank (MR) may be determined in accordance with a Master Preference, a Random Factor, and a Device MAC address based on Equation 1 shown below.

$$MasterRank = MasterPreference \times 2^{56} + Randomfactor \times 2^{56} + MAC[5] \times 2^{40} + \ldots + MAC[0] \quad <\text{Equation 1}>$$

The Master Preference, the Random Factor, and the Device MAC address may be indicated based on a master indication attribute, which is included in the NAN beacon frame. The master indication attribute may be as shown below in Table 2.

TABLE 2

| Field Name | Size | Value | Description |
| --- | --- | --- | --- |
| Attribute ID | 1 | 0x00 | Identifies the type of NAN attribute. |
| Length | 2 | 2 | Length of the following field in the attribute |
| Master Preference | 1 | 0-255 | Information that is used to indicate a NAN Device preference to serve as the role of Master of the NAN device, wherein the larger value indicates the higher preference. |
| Random Factor | 1 | 0-255 | A random number selected by the sending NAN Device |

In relation to the Master Rank, the NAN device, which activates the NAN service and starts the NAN cluster, sets both the master preference value and the random factor value to 0 and, then, resets the NANWarmUp. The NAN device is required to set the master preference value included in the master indication attribute to a value that is greater than 0 and is also required to set the random factor value included in the master indication attribute to a new value until the NANWarmUp is expired.

The NAN device, which has joined a NAN cluster having its master preference of the NAN master set to a value that is greater than 0, may set its master preference value to a value that is greater than 0 and may set its random factor value to a new value, regardless of the expiration or non-expiration of the NANWarmUp.

The NAN device may operate as a NAN master of the NAN cluster in accordance with the value of the Master Rank. More specifically, all of the NAN devices included in the NAN cluster have the capability to operate as the NAN Mater. Herein, the NAN Master has the highest master rank within the NAN cluster. And, a Hop count to the Anchor Master (HC) of the NAN master may be given the value of 0, and, among the NAN devices included in the NAN cluster, the NAN master may have the lowest Anchor Master Beacon Transmit Time (AMBTT) value.

Although a plurality of NAN masters may temporarily exist within the NAN cluster, in principle, one NAN Master may exist in the NAN cluster. A NAN device, which has become the NAN master in the NAN cluster where the corresponding NAN device initially existed, may use the same time synchronization function (TSF) that the NAN device used in its initial NAN cluster.

The NAN device may start a new NAN cluster, or the NAN device may become the NAN master in accordance with the change in the master rank. Alternatively, in case a beacon frame is no longer received from another NAN device, which is being operated as the current NAN master, the corresponding NAN device may become the NAN master. Moreover, among the NAN devices belonging to the NAN cluster, in case a received signal strength indication (RSSI) of the other NAN devices is decreased to a predetermined level or below, the corresponding NAN device may autonomously become the NAN master. NAN devices participating in the same NAN cluster (or NAN devices belong to the same NAN cluster) may be synchronized to a common clock. The TSF of the NAN cluster may be implemented by a distributed algorithm that is required to be performed in all of the NAN devices. Each of the NAN devices participating in the NAN cluster may transmit NAN Sync Beacon frames in accordance with the distributed algorithm.

The NAN device may synchronize a clock during a discovery window. A length of the discovery window corresponds to 16 time units (TUs). One or more NAN devices may transmit synchronization beacon frames in order to help (or aid) all of the NAN devices included in the NAN cluster to synchronize the clock.

The transmission of the NAN synchronization beacon frames corresponds to a distributed transmission. The NAN synchronization beacon frames may be transmitted from a discovery window section existing at intervals of 512 time units. All of the NAN devices may participate in the generation and transmission of NAN synchronization beacon frames in accordance with the role and state of each device. Each of the NAN devices shall maintain its own TSF timer, which is used for NAN beacon cycle timing.

The transmission section of the NAN synchronization beacon frame may be configured by a NAN device that generates the NAN cluster. A series of target beacon transmission times (TBTTs) is defined so that discovery window sections, each being capable of transmitting a NAN synchronization beacon frame, can be spaced apart from one another at intervals of exactly 512 TUs. A time corresponding to 0 is defined as a first TBTT, and the discovery window starts from each TBTT.

Each NAN device performing the role of the NAN master may transmit a NAN discovery beacon frame from a section excluding the NAN discovery window. On average, the NAN master may transmit a NAN discovery beacon frame at an interval of 100 TUs. A time period between contiguous NAN discovery beacon frames, which are transmitted by one NAN master, may be equal to 200 TUs or less.

In case an estimated transmission time of a NAN discovery beacon frame overlaps with a NAN discovery window section of the NAN cluster, the NAN master may omit the process of transmitting the NAN discovery beacon frame. In order to minimize the power for transmitting the NAN discovery beacon frame, the NAN master may transmit a NAN discovery beacon frame via contention-based transmission based on a channel access parameter corresponding to access category_voice (AC_VO).

Also, the NAN device may transmit a NAN service discovery frame within a discovery window section. The NAN service discovery frame may be transmitted by all of the NAN devices. More specifically, the NAN device may transmit a NAN service discovery frame and/or a NAN synchronization beacon frame based on a contention between a discovery window start point (TStartDW) and a discovery window end point (TEndDW). In case the NAN device is in the Master state or the Non-Master state, the NAN device may transmit both the NAN service discovery frame and the NAN synchronization beacon frame within the discovery window.

In the conventional NAN related technology, the data transmission method between the NAN devices is not defined, and the authentication and association procedures are not defined. Hereinafter, the exemplary embodiment of the present invention discloses an authentication procedure/association procedure being performed beforehand between the NAN devices for data transmission and data reception between the NAN devices. Moreover, the exemplary embodiment of the present invention discloses an authentication procedure/association procedure and a data communication procedure between the NAN devices that are simplified in order to allow a minimum number of wireless resources to be used for the data communication, which is based on the authentication procedure/association procedure.

Figure 11:
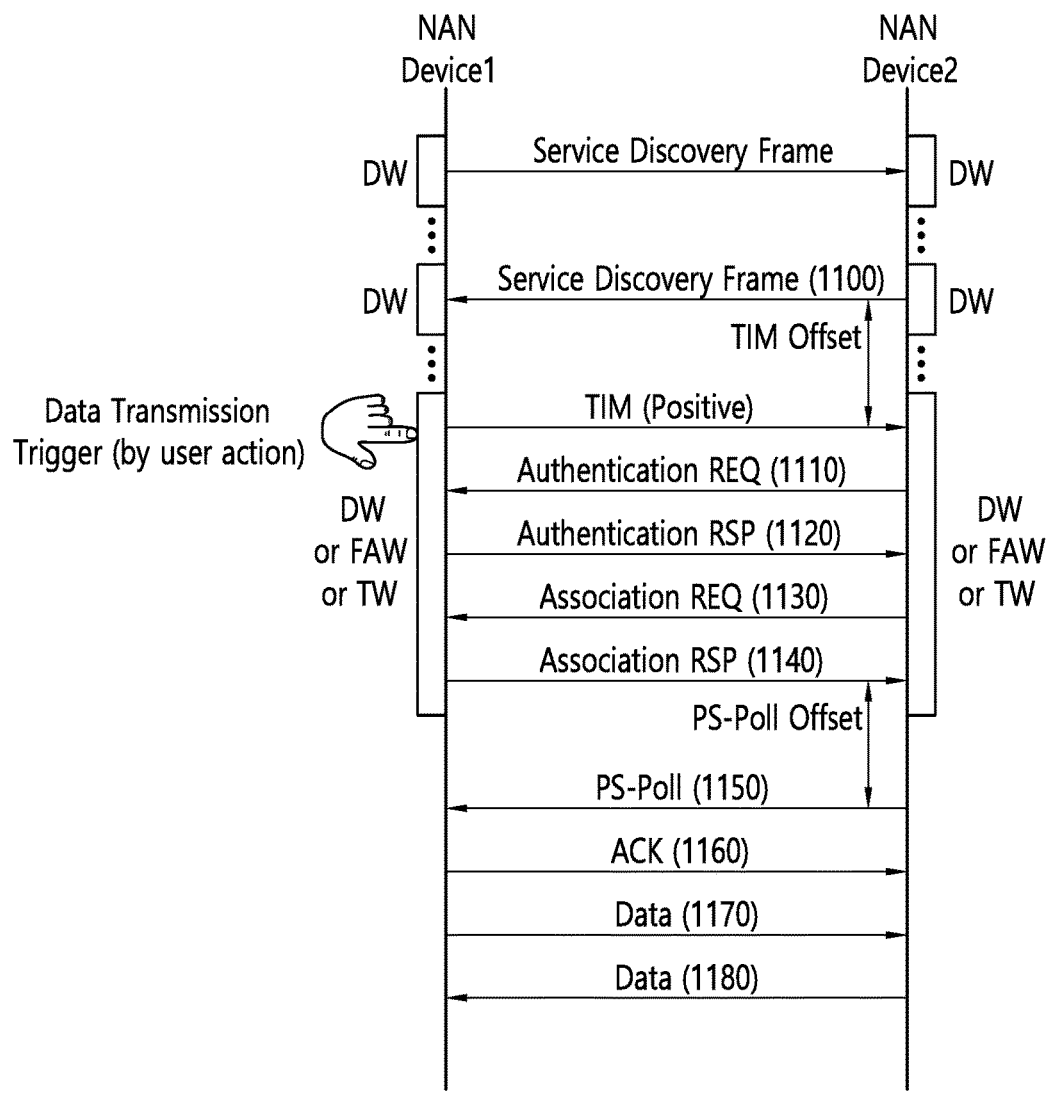
FIG. 11 is a conceptual view illustrating authentication/association procedures between NAN devices according to an exemplary embodiment of the present invention.

FIG. 11 is a conceptual view illustrating authentication/association procedures between NAN devices according to an exemplary embodiment of the present invention.

FIG. 11 discloses an association procedure between NAN devices based on a transmission of a Traffic Indication Map (TIM) element, which is triggered by a specific NAN device by a user's action, and a transmission of a TIM element, which is triggered by a specific NAN device.

According to the exemplary embodiment of the present invention, in case data transmission is required by a user's action corresponding to the NAN device, the NAN device may perform an authentication procedure and an association procedure.

For example, the user's action may correspond to an operation of initiating chatting with other devices by executing a chatting application (or app), an operation of sharing a song with other devices by executing a music-related app, and so on.

In case data transmission is required from a NAN device1 to a NAN device2 due to the above-described user's action, the NAN device1 may transmit a frame including a TIM element to the NAN device1.

The TIM element being transmitted by the NAN device1 may be included in a TIM-dedicated management frame (e.g., a TIM unicast frame or a TIM broadcast frame) and may then be transmitted. Alternatively, the TIM element being transmitted by the NAN device1 may be included in a NAN management frame (e.g., NAN service discovery frame, NAN sync beacon frame, NAN discovery frame, and so on). Hereinafter, a frame including the TIM element may be expressed by using the term TIM frame. Also, the NAN service discovery frame may also be expressed by using the term service discovery frame, the NAN sync beacon frame may also be expressed by using the term sync beacon frame, and the NAN discovery frame may also be expressed by using the term discovery frame.

In order to indicate to the presence of data (or pending data) that are to be transported to the NAN device2, the NAN device1 may transmit a TIM frame. The TIM element that is included in the TIM frame may include identification information for indicating the presence of data being buffered to the NAN device2. For example, the corresponding TIM element may include medium access control (MAC) address of the NAN device2 or a NAN TIM ID of the NAN device2. The NAN TIM ID may correspond to a newly defined identifier allowing the NAN device to receive the TIM element and to determine whether or not the TIM element corresponds to the TIM that was delivered (or transported) to the NAN device.

The NAN device2 may receive the TIM frame and may recognize the presence of buffered (or pending) data that are to be transmitted to the NAN device2 in the NAN device1. The NAN device2 may acquire information on a transmission point of the TIM frame by using diverse methods and may then monitor and receive the TIM frame.

For example, the NAN device2 may acquire information on the transmission point of the TIM frame based on the service discovery frame. The NAN device2 may transmit TIM offset information, which is used for determining the transmission point of the TIM frame, by including the TIM offset information in the service discovery frame. The NAN device1 may receive the TIM offset information and may transmit the TIM frame to the NAN device2 based on the received TIM offset information. Alternatively, the NAN device1 may transmit the TIM offset information, which is used for determining the transmission point of the TIM frame, by including the TIM offset information in the service discovery frame. The NAN device2 may receive the TIM offset information and may receive the TIM frame based on the received TIM offset information. Alternatively, the NAN device2 may also implicitly calculate at which time point the NAN device2 intends to receive the TIM frame.

The NAN device2, which has received the TIM frame, receives the TIM frame and may determine the presence or absence (or existence or non-existence) of buffered data for the NAN device2 in the NAN device1. If the traffic indicator corresponding to the NAN device2 is a positive traffic indicator, the NAN device2 may verify the presence (or existence) of buffered data for the NAN device2. In other words, the NAN device2 may verify the buffered data for the NAN device2 in the NAN device1 based on a bit corresponding to the NAN device2 in a traffic indication virtual bitmap included in the TIM element.

The NAN device2 may transmit an authentication request frame to the NAN device1 so as to request an authentication procedure. The NAN device1 may transmit an authentication response frame as a response to the received authentication request frame, so as to complete the authentication procedure.

The NAN device2 may transmit an association request frame to the NAN device1 so as to request an association procedure. The NAN device1 may transmit an association response frame as a response to the association request frame, which is received from the NAN device2.

The NAN device may receive the association response frame and may transmit a power save (PS)-poll frame after a predetermined time period, so as to request (or to perform polling on) buffered data for the NAN device2 to the NAN device1. The predetermined time period may be determined by a PS-poll offset, and information on the PS-poll offset may be transmitted by being included in the association response frame.

In other words, the PS-poll offset may correspond to time information that is referred to for the transmission of the PS-poll frame. By applying the time point at which the frame including the PS-poll offset is received as the start point, the PS-poll frame may be transmitted after a PS-poll offset starting from the start point. The PS-poll frame may also be expressed by using the term polling frame, and the PS-poll offset may also be expressed by using the term polling offset.

The NAN device1 may receive the PS-poll frame and may transmit an ACK frame as a response to the PS-poll frame and, thereafter, the NAN device1 may transmit a data frame including the buffered data for the NAN device2 to the NAN device2. Alternatively, the NAN device1 may also transmit a data frame to the NAN device2 without performing any ACK frame transmission. After the association procedure, the NAN device2 may also transmit a data frame to the NAN device1.

According to the exemplary embodiment of the present invention, a time period during which the transmission of the TIM frame and the authentication procedure and association procedure are performed may correspond a time period corresponding to a current discovery window. The current discovery window may correspond to a discovery window through which the service discovery frame including the TIM offset information is transmitted.

Alternatively, a time period during which the transmission of the TIM frame and the authentication procedure and association procedure are performed may correspond a time period corresponding to a next discovery window. The next discovery window may correspond to a discovery window that is configured after the discovery window through which the service discovery frame including the TIM offset information is transmitted.

Alternatively, a time period during which the transmission of the TIM frame and the authentication procedure and association procedure are performed may correspond a time period corresponding to a further availability window (FAW). The FAW may be determined based on further availability window (FAW) information, which is included in a service discovery frame that was received during a previous discovery window. The NAN device may configure the FAW based on the service discovery frame, and the TIM transmission procedure and the authentication procedure/association procedure may be performed in the FAW.

Alternatively, a time period for the TIM transmission procedure and the authentication procedure/association procedure may be defined as a TIM window (TW), and information corresponding to the TW may be transmitted through the service discovery frame. For example, the TW may be configured by a TIM window offset and/or a TIM offset duration. The TIM window offset may also be interpreted and understood to have the same meaning as the above-described TIM window offset.

The TIM window offset may correspond to a value for indicating a starting point at which a TIM window (TW) is begins (or starts). A time point to which the TIM window offset is applied may correspond to an expiration time point of a DW time period during which the service delivery frame is transmitted. More specifically, the TW may start (or begin) after a TIM window offset based on the time point at which the DW is expired. Alternatively, a time point to which the TIM window offset is applied may correspond to a reception point of the service discovery frame. More specifically, the TW may begin (or start) after a TIM window offset based on a receiving point of the service discovery frame, which includes information on the TW.

A TIM window duration may correspond to a time period (or duration) of the TW in which the NAN device may perform the TIM transmission procedure and the authentication procedure and association procedure.

According to the exemplary embodiment of the present invention, even in a case when the TIM transmission procedure and the authentication procedure and association procedure are all performed within a duration of the DW, FAW, or TW, a time period corresponding to the DW, FAW, or TW may not be expired. In this case, a PS-Poll frame transmission procedure and a data frame transmission procedure may be performed during the remaining duration of the DW, FAW, or TW that remains after performing the TIM transmission procedure and the authentication procedure and association procedure.

For example, the duration of the DW, FAW, or TW may be longer than the time period for the TIM frame transmission procedure and the authentication procedure and association procedure. In this case, a PS-Poll frame transmission procedure and a data frame transmission procedure may be performed during the remaining duration of the DW, FAW, or TW that remains after performing the TIM transmission procedure and the authentication procedure and association procedure.

For example, in case the timing that is indicated to the PS-poll frame offset is included in the remaining duration of the DW, FAW, or TW, the PS-Poll frame transmission procedure and the data frame transmission procedure may be performed during the remaining duration. Alternatively, in case the remaining duration of the DW, FAW, or TW is equal to or longer than (or greater than) a predetermined threshold value, the NAN device may determine to configure the PS-poll frame offset to be within the remaining duration of the DW, FAW, or TW. Even if the NAN device2 transmits a PS-poll frame via contention based transmission without configuring (or considering) the PS-poll frame offset, after the association procedure, the PS-Poll frame transmission procedure and the data frame transmission procedure may be performed within the above-described remaining duration.

Alternatively, after the TIM frame transmission procedure and the authentication procedure and association procedure are performed during the duration of the DW, FAW, or TW, in case the duration of the DW, FAW, or TW is not yet expired, instead of maintaining the DW, FAW, or TW during the remaining duration, early termination of the DW, FAW, or TW may be carried out.

Alternatively, after the TIM frame transmission procedure and the authentication procedure and association procedure are performed during the duration of the DW, FAW, or TW, in case the duration of the DW, FAW, or TW is not yet expired, the NAN device can wait until the duration of the DW, FAW, or TW is expired. After the expiration of the DW, FAW, or TW, the PS-poll frame transmission procedure and the data frame transmission procedure may be performed.

FIG. 12 is a conceptual view illustrating a service discovery frame and an association response frame according to an exemplary embodiment of the present invention.

Referring to an upper part of FIG. 12, the service discovery frame may include TIM window offset information and TIM window duration information.

The TIM window offset information may include information on the start point of the TW. For example, the TIM window offset information may include offset information for indicating a start point of the TW after the expiration of a DW section (or period) during which the service discovery frame is transmitted.

The TIM window duration information may include information on the time section (or time period) for performing the TIM frame transmission procedure and the authentication procedure, and the association procedure.

Referring to a lower part of FIG. 12, an association response frame may include a NAN information element, and the NAN information element may include PS-poll offset information. The PS-Poll offset information may also be expressed differently by using the term polling information.

The PS-poll offset information may include offset information determining a transmission time point of the PS-Poll frame. The NAN device, which has received the association response frame, may transmit a PD-Poll frame to another NAN device at the reception time point of the association response frame based on an offset, which is indicated by the PS-poll offset information.

Figure 13:
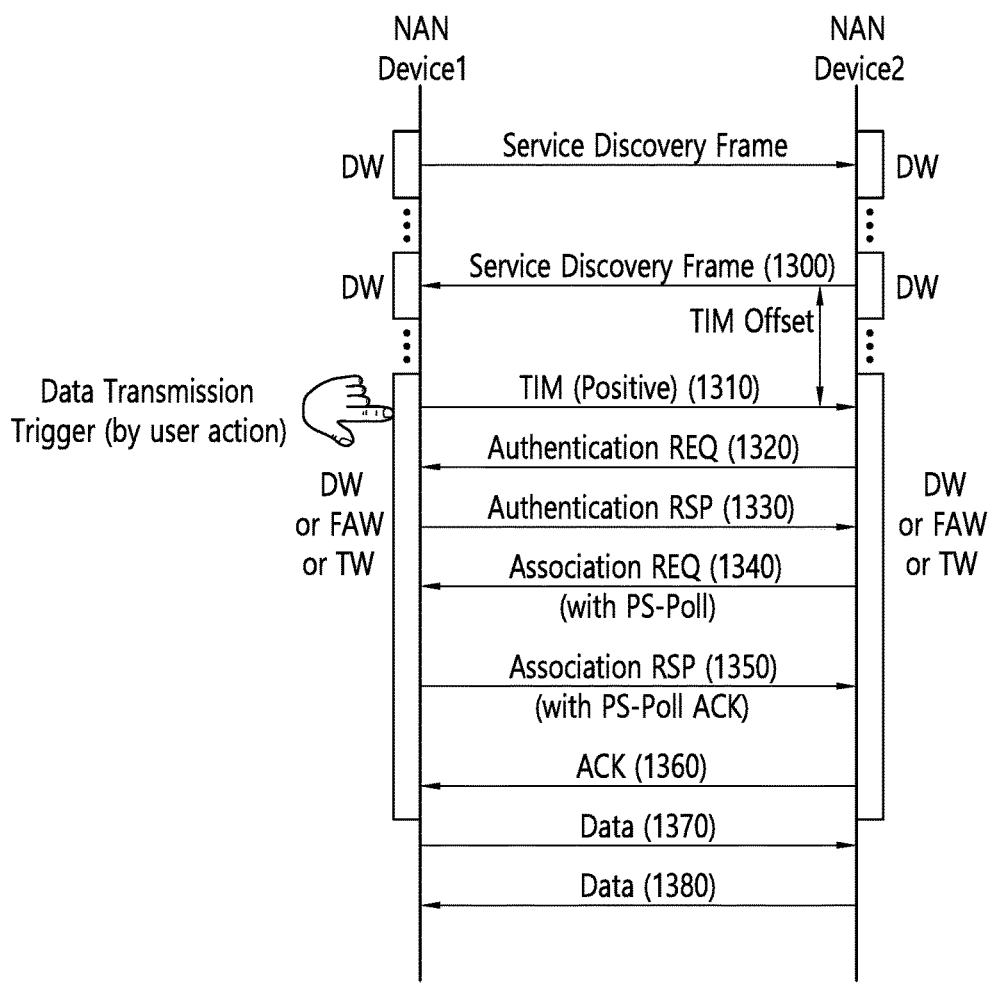
FIG. 13 is a conceptual view illustrating authentication/association procedures between NAN devices according to an exemplary embodiment of the present invention.

FIG. 13 is a conceptual view illustrating authentication/association procedures between NAN devices according to an exemplary embodiment of the present invention.

FIG. 13 discloses a PS-poll frame based polling procedure that is based on an association request frame/association response frame, which are transmitted and received during the association procedure.

Referring to FIG. 13, the NAN device may be triggered by a user's action, which required data transmission, and may then transmit a TIM frame.

In case a user's action is generated on the NAN device1 and data are required to be transmitted to the NAN device2, the NAN device2 is required to perform an authentication procedure and an association procedure. Before performing the authentication procedure and the association procedure, the NAN device1 may transmit a TIM frame to the NAN device2.

As described above, the TIM frame may correspond to a TIM-dedicated management frame or a NAN management frame. The TIM element being included in the TIM frame may include an indicator indicating buffered data for the NAN device2 (or identification information corresponding to the NAN device2).

The NAN device2 that has received the TIM frame may receive the TIM frame and may determine the presence or absence (or existence or non-existence) of the buffered data for the NAN device2 in the NAN device1. If a traffic indicator corresponding to the NAN device2 is a positive traffic indicator, the NAN device2 may verify the presence (or existence) of the buffered data for the NAN device2.

The NAN device2 may request for an authentication procedure by transmitting an authentication request frame to the NAN device1. The NAN device 1 may complete the authentication procedure by transmitting an authentication response frame as a response to the authentication request frame, which was received from the NAN device2.

The NAN device2 may request for an association procedure by transmitting an association request frame to the NAN device1. The NAN device1 may transmit an association response frame as a response to the association request frame, which was received from the NAN device2.

According to the exemplary embodiment of the present invention, a polling procedure polling buffered data for the NAN device by performing transmission and reception procedures of the association request frame/association response frame.

The association request frame/association response frame may include information for performing the polling procedure, which is based on the PS-poll frame. The information for the polling procedure, which is based on the PS-poll frame, may also be expressed by using the term PS-poll element. More specifically, the association request frame/association response frame may include a NAN information element, and the NAN information element may include a PS-poll element. The PS-poll element may also be expressed by using the term polling element.

For example, the PS-poll element may include token information, a NAN TIM ID, transmitter address (TA) information, and receiver address (RA) information.

The token information may correspond to a parameter for identifying whether the PS-poll element is used for the purpose of PS-poll based polling or for the purpose of acknowledgement (ACK) of the PS-poll based polling. In case the value of the token information is equal to 0, this may indicate that the PS-poll element is used for the purpose of PS-poll based polling, and, in case the value of the token information is equal to 1, this may indicate that the PS-poll element is used for the purpose of ACK of the PS-poll based polling.

In case the token information is set to 1, the NAN TIM ID and the TA information may not be included in the PS-poll element. The NAN device receiving the association response frame may correspond to a NAN device that transmits the association response frame without the TA information. Accordingly, the NAN TIM ID and the TA of the NAN device, which transmits the association response frame, may not be included in the PS-poll element of the association response frame.

More specifically, the PS-poll element being included in the association request frame may include the token information that is set to 0, the NAN TIM ID, the TA information, and the RA information. The PS-poll element that is included in the association response frame may include the token information that is set to 1 and the RA information, and the NAN device may notify the reception of the PS-poll element through the association request frame by using the token information.

The NAN TIM ID may include identification information of the NAN device included in the TIM element (or TIM message). The NAN TIM ID may correspond to a newly defined identifier for identifying whether or not the NAN device has received a TIM element and whether or not the received TIM element corresponds to the TIM, which is transported to the NAN device. The NAN TIM ID may correspond to MAC address of the NAN device. Alternatively, the NAN TIM ID may correspond to diverse identifiers defined to identify whether or not the NAN device has received the TIM element and to identify the presence (or existence) of buffered data for the NAN device in the TIM element.

The TA information may include a NAN MAC address or identifier of a NAN device transmitting a PS-Poll element (or starting a PS-poll based polling procedure). For example, referring to FIG. 13, the TA information of a PS-poll element, which is included in the association request frame, may include a NAN MAC address or identifier of the NAN device2, which transmits the association request information.

The RA information may include a NAN MAC address or identifier of the NAN device1, which receives the association request frame. Referring to FIG. 13, the RA information of the PS-poll element, which is included in the association request frame, may include the NAN MAC address or identifier of the NAN device1, which receives the association request frame.

Since TA information/RA information is/are already included in the MAC header of the association request frame/association response frame, which correspond to management frames, the TA information and the RA information may not be include in the PS-Poll element.

The NAN device2 that has received the TIM frame may perform the PS-poll based polling by transmitting the association request frame, which includes the PS-poll element. The NAN device1 may receive the association request frame including the PS-Poll element and may transmit an association response frame including the PS-poll element and may then transmit an ACK corresponding to the PS-poll polling to the NAN device2.

In case the polling procedure that is based on the association request frame/association response frame is performed, the PS-poll based polling procedure may be performed without the transmission of a separate control frame.

The NAN device2 may transmit an ACK frame corresponding to the association response frame to the NAN device1. The NAN device1 may receive the ACK frame, and, then, the NAN device1 may transmit a data frame including the data buffered for the NAN device2. The NAN device2 may also transmit a data frame to the NAN device1 after the association procedure.

FIG. 14 is a conceptual view illustrating an association request frame/association response frame according to an exemplary embodiment of the present invention.

FIG. 14 discloses an association request frame/association response frame for performing the PS-poll based polling procedure.

Referring to an upper part of FIG. 14, the association request frame may include a NAN information element, and the NAN information element may include a PS-poll element. The PS-poll element may include token information, NAN TIM ID, TA information, and RA information.

The token information may correspond to a parameter for identifying whether the PS-poll element is used for the purpose of PS-poll based polling or for the purpose of ACK of the PS-poll based polling. The value of the token information is set to 0, which may indicate that the PS-poll element is used for the purpose of PS-poll based polling.

The NAN TIM ID may include identification information of the NAN device that is used by the TIM element (or TIM message).

The TA information may include a NAN MAC address or identifier of a NAN device transmitting a PS-Poll element through the association request frame.

The RA information may include a NAN MAC address or identifier of the NAN device, which is to receive the association request frame.

Since TA information/RA information is/are already included in the MAC header of the association request frame/association response frame, which correspond to management frames, the TA information and the RA information may not be include in the PS-Poll element.

Referring to a lower part of FIG. 14, the association request frame may include a NAN information element, and the NAN information element may include a PS-poll element. The PS-poll element may include token information and RA information.

The value of the token information is set to 1, which may indicate that the PS-poll element is used for the purpose of ACK corresponding to the PS-poll based polling.

The RA information may include a NAN MAC address or identifier of the NAN device, which is to receive the association request frame.

Figure 15:
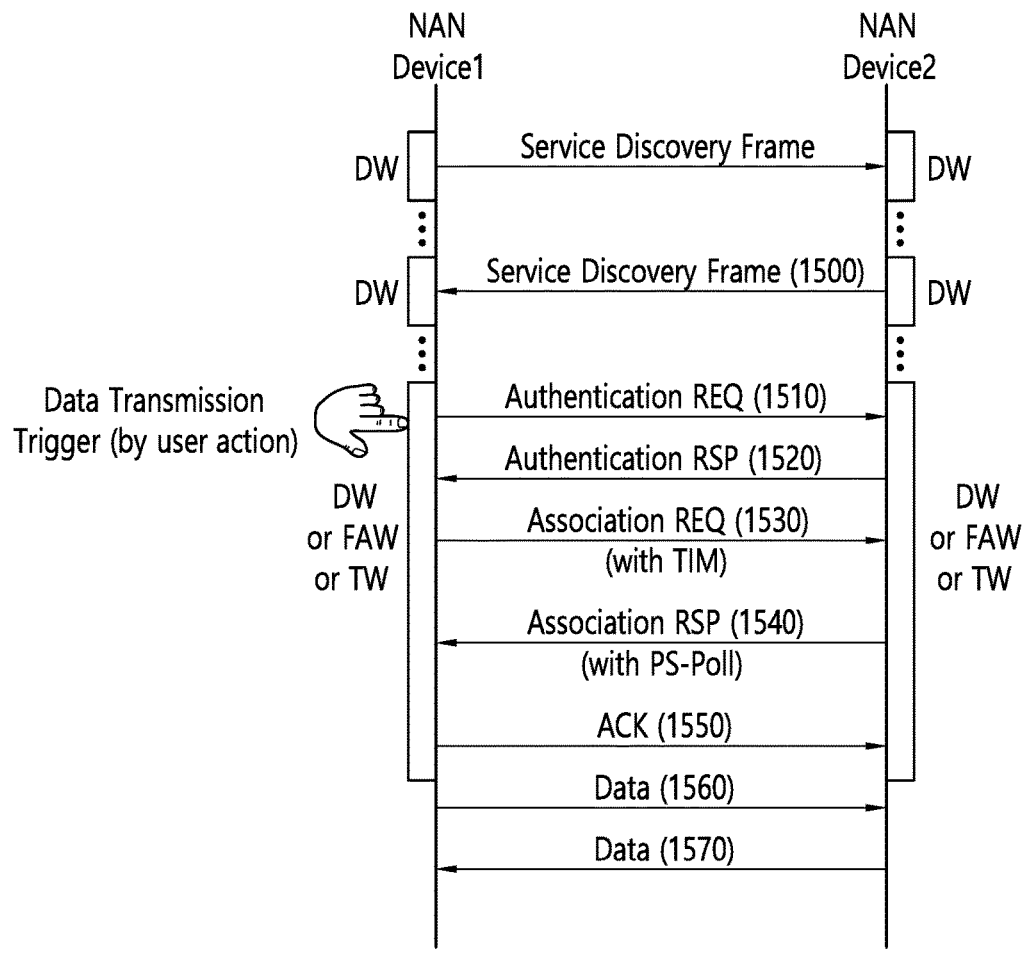
FIG. 15 is a conceptual view illustrating authentication/association procedures between NAN devices according to an exemplary embodiment of the present invention.

FIG. 15 is a conceptual view illustrating authentication/association procedures between NAN devices according to an exemplary embodiment of the present invention.

FIG. 15 discloses a method for triggering an authentication procedure and an association procedure in accordance with a user's action and a method for transmitting a TIM element through an association request frame.

Referring to FIG. 15, an authentication procedure may be triggered by a user's action, which requires data transmission. For example, in case a user's action is generated on the NAN device 1, an association request frame may be transmitted to the NAN device2. The NAN device2 may correspond to a target device that is to receive the data generated from the NAN device 1 in accordance with the user's action.

The NAN device2 may transmit an authentication response frame to the NAN device1.

After completing the authentication procedure, the NAN device1 may transmit an association request frame to the NAN device2. The association request frame may include an TIM element. The NAN device2 may receive the TIM element, and, in case an identifier of the NAN device2 is included in the TIM element, the NAN device2 may recognize the data for the NAN device2 that are buffered in the NAN device 1.

In case the TIM element included in the association request frame indicates the data for the NAN device2 that are buffered in the NAN device1, the NAN device2 may transmit the association response frame to the NAN device1. The association request frame may include the PS-poll element, and the association request frame may perform the PS-poll based polling procedure based on the PS-poll element.

The PS-poll element, which is included in the association response frame, may include a NAN TIM ID, TA information, and RA information. The TA information or the RA information may not be included herein.

The NAN TIM ID may include identification information of the NAN device included in the TIM element (or TIM message).

The NAN TIM ID may correspond to MAC address of the NAN device. Alternatively, the NAN TIM ID may correspond to diverse identifiers defined to identify whether or not the NAN device has received the TIM element and to identify the presence (or existence) of buffered data for the NAN device in the TIM element.

The TA information may include a NAN MAC address or identifier of a NAN device transmitting a PS-Poll element (or starting a PS-poll based polling procedure). Referring to FIG. 15, the TA information may include a NAN MAC address or identifier of the NAN device2, which transmits the association request information.

The RA information may include a NAN MAC address or identifier of the NAN device1, which receives the association request frame. Referring to FIG. 15, the RA information may include the NAN MAC address or identifier of the NAN device1, which receives the association request frame.

The PS-poll element, which is included in the association response frame, may further include information indicating the polling of data or token information indicating that the PS-poll element is used for the purpose of PS-poll based polling.

The NAN device1, which has received the association response frame including the PS-poll element transmitted from the NAN device2, may transmit an ACK frame corresponding to the association response frame to the NAN device2 and may transmit a data frame to the NAN device2. Alternatively, the NAN device1 may transmit a data frame to the NAN device2 without performing any separate ACK frame transmission. The NAN device2 may also transmit a data frame to the NAN device1.

FIG. 16 is a conceptual view illustrating an association request frame/association response frame according to an exemplary embodiment of the present invention.

FIG. 16 discloses an association request frame/association response frame for performing the PS-poll based polling procedure.

Referring to an upper part of FIG. 16, the association request frame may include a NAN information element, and the NAN information element may include a TIM element.

The element may include information indicating data that are buffered for the NAN device. For example, the TIM element may include a traffic indication virtual bitmap, and each bit being included in the traffic indication virtual bitmap may indicate the presence or absence (or existence or non-existence) of data that buffered to the NAN device, wherein the data have NAN TIM ID corresponding to each bit.

Referring to a lower part of FIG. 16, the association request frame may include a NAN information element, and the NAN information element may include a PS-poll element. The PS-poll element may include NAN TIM ID, TA information, and RA information.

The NAN TIM ID may include identification information of the NAN device that is used by the TIM element (or TIM message).

The TA information may include a NAN MAC address or identifier of a NAN device transmitting a PS-Poll element through the association request frame.

The RA information may include a NAN MAC address or identifier of the NAN device, which is to receive the association request frame.

Since TA information/RA information is/are already included in the MAC header of the association request frame/association response frame, which correspond to management frames, the TA information and the RA information may not be include in the PS-Poll element.

Figure 17:
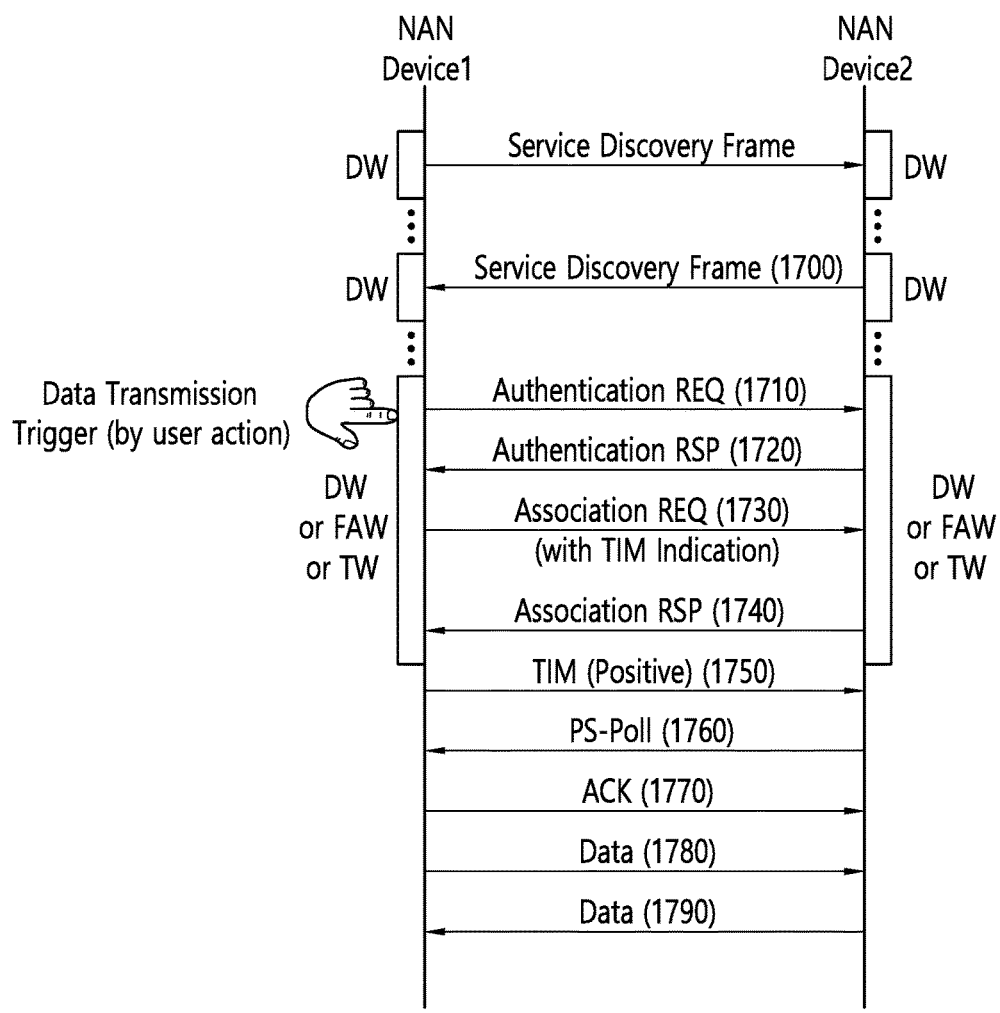
FIG. 17 is a conceptual view illustrating authentication/association procedures between NAN devices according to an exemplary embodiment of the present invention.

FIG. 17 is a conceptual view illustrating authentication/association procedures between NAN devices according to an exemplary embodiment of the present invention.

FIG. 17 discloses a method for triggering an authentication procedure and an association procedure in accordance with a user's action and a method for transmitting a TIM indicator information through an association request frame.

Referring to FIG. 17, as described above in FIG. 15, the authentication procedure and the association procedure may be triggered by the user's action, and the transmission of the TIM element (or TIM frame) and the transmission of the PS-poll frame may be performed after a configured window (DW, FAW, or TW) section.

More specifically, the authentication procedure may be triggered by the user's action, which requires data transmission. For example, in case a user's action is generated on the NAN device1, an authentication request frame may be transmitted to the NAN device2. The NAN device2 may correspond to a target device that is to receive the data generated from the NAN device1 due to the user's action.

The NAN device2 may transmit an authentication response frame to the NAN device1.

After completing the authentication procedure, the NAN device1 may transmit an association request frame to the NAN device2. The association request frame may include a TIM indicator (or TIM indication). The TIM indicator may correspond to an indicator for notifying (or indicating) in advance the transmission of the TIM element. The TIM indicator may be used for the purpose of indicating an awake state to be maintained until the reception of the TIM element by notifying in advance the transmission of the TIM element. The NAN device2, which receives the association request frame including the TIM indicator, may transmit an association response frame to the NAN device1.

The NAN device1, which has received the association request frame, may transmit a TIM frame including the TIM element to the NAN device2. The TIM element may indicate the buffered data for the NAN device2.

The NAN device2, which has received the TIM frame, verifies the TIM element included in the TIM frame and may transmit a PS-poll frame to the NAN device1. And, the NAN device1 may transmit an ACK frame as a response to the PS-poll frame. The NAN device1, which has received the ACK frame, may transmit a data frame including the data buffered for the NAN device2 to the NAN device2. The NAN device2 may also transmit a data frame to the NAN device1.

Figure 18:
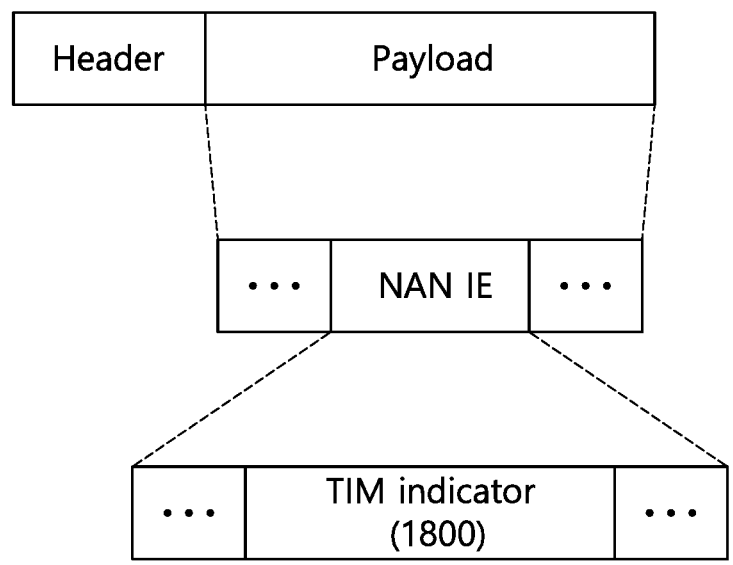
FIG. 18 is a conceptual view illustrating an association request frame according to an exemplary embodiment of the present invention.

FIG. 18 is a conceptual view illustrating an association request frame according to an exemplary embodiment of the present invention.

Referring to FIG. 18, the association request frame may include a NAN information element, and the NAN information element may include a TIM indicator.

Referring to FIG. 18, the TIM indicator may include information for indicating the transmission of the TIM element.

In other words, the TIM indicator may be used for the purpose of indicating an awake state to be maintained until the reception of the TIM element by notifying in advance that the TIM element will be transmitted.

Figure 19:
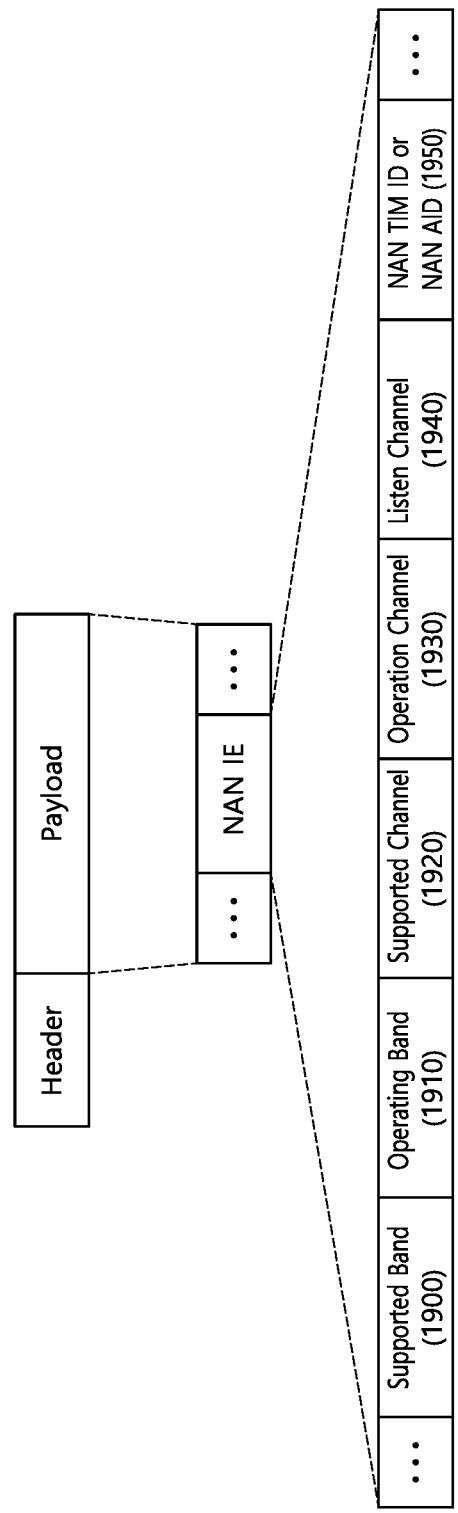
FIG. 19 is a conceptual view illustrating parameters being included in NAN information elements according to an exemplary embodiment of the present invention.

FIG. 19 is a conceptual view illustrating parameters being included in NAN information elements according to an exemplary embodiment of the present invention.

Referring to FIG. 19, the NAN information element (IE) may include supported band information, operating band information, supported channel information, operating channel information, supported channel information, operating channel information (or operation channel information), receiving channel information (or listen channel information), and NAN TIM ID or NAN association identifier (AID) information.

The supported band information may include information on a frequency band through which the NAN device is capable of performing communication. In other words, the supported band information may include information on a frequency band that is supported by the NAN device. For example, the frequency band through which the NAN device is capable of performing communication may correspond to at least any one of 2.4 GHz, 5 GHz, and 60 GHz.

The operating band information may include information on a frequency band that is currently being operated/in operation. For example, the frequency band that is currently being operated/in operation may correspond to 2.4 GHz, 5 GHz, or 60 GHz.

The supported channel information may include information on a channel that is supported by the NAN device.

The operating channel information may include information on the channel in which the NAN device is being operated.

The receiving channel information (or listen channel information) may include information on a channel that is currently being listened or monitored by the NAN device for discovery.

The NAN TIM ID or NAN AID information may include identification information (TIM ID or AID) of the NAN device. The NAN TIM ID may correspond to a newly defined identifier allowing the NAN device to receive the TIM and to determine whether or not the received TIM corresponds to the TIM that was delivered (or transported) to the NAN device. The NAN AID may correspond to an identifier that is acquired by the NAN device during the association procedure.

Figure 20:
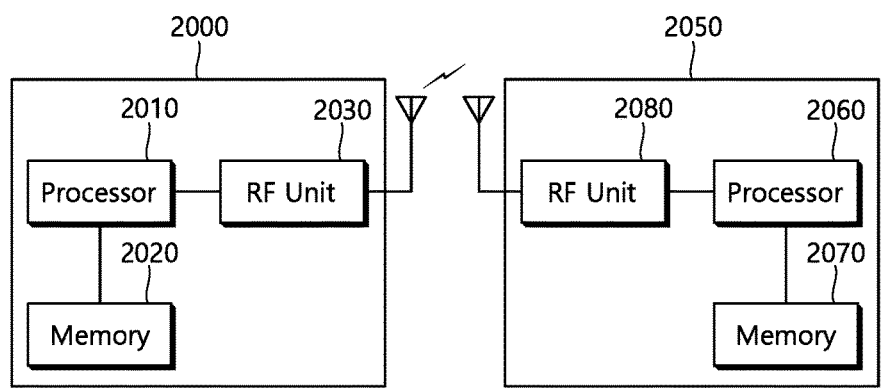
FIG. 20 is a block view illustrating a wireless device to which the exemplary embodiment of the present invention can be applied.

FIG. 20 is a block view illustrating a wireless device to which the exemplary embodiment of the present invention can be applied.

Referring to FIG. 20, the AP 2000 includes a processor 2010, a memory 2020, and a radio frequency (RF) unit 2030.

The RF unit 2030 is connected to the processor 2010, thereby being capable of transmitting and/or receiving radio signals.

The processor 2010 implements the functions, processes, and/or methods proposed in the present invention. For example, the processor 2010 may be implemented to perform the operations of the AP according to the above-described exemplary embodiments of the present invention. The processor may perform the operations of a NAN device that is triggered by a user's action to transmit data, which are disclosed in the exemplary embodiments of FIG. 11 to FIG. 19.

For example, the processor 2010 may be configured to allow a first NAN device to receive a service discovery frame from a second NAN device and to allow the first NAN device to be triggered by a user's action so as to transmit a TIM element to the second NAN device.

Also, the processor 2010 may be configured to allow the first NAN device to perform an authentication procedure and an association procedure with the second NAN device based on a request made by the second NAN device, which has received the TIM element, to allow the first NAN device to receive a polling frame (or PS-poll frame) from the second NAN device, and to allow the first NAN device to transmit data that are buffered for the second NAN device to the second NAN device as a response to the polling frame.

The STA 2050 includes a processor 2060, a memory 2070, and a radio frequency (RF) unit 2080.

The RF unit 2080 is connected to the processor 2060, thereby being capable of transmitting and/or receiving radio signals.

The processor 2060 implements the functions, processes, and/or methods proposed in the present invention. For example, the processor 2060 may be implemented to perform the operations of the STA according to the above-described exemplary embodiments of the present invention. The processor 2060 may perform the operations of the NAN device (or NAN mode STA), which are disclosed in the exemplary embodiments of FIG. 11 to FIG. 19.

For example, the processor 2060 may be configured to allow the second NAN device to transmit a service discovery frame including TW-related information, and to allow the second NAN device to receive a TIM element from the first NAN device, and to allow the second NAN device to perform an authentication procedure and an association procedure with the first NAN device.

Also, the processor 2060 may be configured to allow the second NAN device to transmit a polling frame to the first NAN device and to allow the second NAN device to receive a data frame including the buffered data from the first NAN device based on the polling frame.

The processor 2010 and 2060 may include an application-specific integrated circuit (ASIC), another chip set, a logical circuit, a data processing device, and/or a converter converting a baseband signal and a radio signal to and from one another. The memory 2020 and 2070 may include a read-only memory (ROM), a random access memory (RAM), a flash memory, a memory card, a storage medium, and/or another storage device. The RF unit 2030 and 2080 may include one or more antennas transmitting and/or receiving radio signals.

When the exemplary embodiment is implemented as software, the above-described method may be implemented as a module (process, function, and so on) performing the above-described functions. The module may be stored in the memory 2020 and 2070 and may be executed by the processor 2010 and 2060. The memory 2020 and 2070 may be located inside or outside of the processor 2010 and 2060 and may be connected to the processor 2010 and 2060 through a diversity of well-known means.

What is claimed is:

1. A data communication method between neighbor awareness networking (NAN) devices, the method comprising:

receiving, by a first NAN device, a service discovery frame from a second NAN device, wherein the service discovery frame includes traffic indication map (TIM) window offset information for configuring a start point of a TIM window (TW) and TIM window duration information for configuring a duration of the TW;

transmitting, by the first NAN device having received the service discovery frame, a TIM element to the second NAN device, in response to a user's action, wherein the TIM element is transmitted during the duration of the TW, and wherein the TIM element includes information related to data being buffered for the second NAN device;

performing, by the first NAN device, an authentication procedure and an association procedure with the second NAN device based on a request from the second NAN device having received the TIM element, wherein the authentication procedure and the association procedure are performed during the duration of the TW, and wherein when the authentication procedure and association procedure have ended, the TW is capable of ending earlier than the duration of the TW;

receiving, by the first NAN device, a polling frame from the second NAN device; and transmitting, by the first NAN device, data being buffered for the second NAN device to the second NAN device as a response to the polling frame.

2. The method of claim 1, wherein a transmission time of the polling frame is determined based on polling offset information being included in an association response frame, the association response frame being transmitted by the first NAN device during the association procedure.

3. A neighbor awareness networking (NAN) device performing a data communication method, the NAN device comprising:

transmitter and receiver; and a processor, wherein the processor is configured:

to control the receiver to receive a service discovery frame from another NAN device, wherein the service discovery frame includes traffic indication map (TIM) window offset information for configuring a start point of a TIM window (TW) and TIM window duration information for configuring a duration of the TW, to control the transmitter to transmit, after receiving the service discovery frame, a TIM element to the other NAN device, in response to a user's action, wherein the TIM element is transmitted during the duration of the TW, and wherein the TIM element includes information related to data being buffered for the other NAN device, to perform an authentication procedure and an association procedure with the other NAN device based on a request from the other NAN device having received the TIM element, wherein the authentication procedure and the association procedure are performed during the duration of the TW, and wherein when the authentication procedure and association procedure have ended, the TW is capable of being ending earlier than the duration of the TW, to control the receiver to receive a polling frame from the other NAN device, and to control the transmitter to transmit data being buffered for the other NAN device to the other NAN device as a response to the polling frame.

4. The device of claim 3, wherein a transmission time of the polling frame is determined based on polling offset information being included in an association response frame, the association response frame being transmitted by the NAN device during the association procedure.

* * * * *